United States Patent [19]

Rosen et al.

[11] Patent Number: 4,969,096
[45] Date of Patent: Nov. 6, 1990

[54] METHOD FOR SELECTING COMMUNICATION DEVICES FOR NON-SPEAKING PATIENTS

[75] Inventors: Michael J. Rosen; Cheryl Goodenough-Trepagnier, both of Arlington, Mass.

[73] Assignees: New England Medical Center, Boston; Massachusetts Institute of Technology, Cambridge, both of Mass.

[21] Appl. No.: 412,579

[22] Filed: Sep. 25, 1989

Related U.S. Application Data

[63] Continuation of Ser. No. 179,653, Apr. 8, 1988, abandoned.

[51] Int. Cl.[5] .............................................. G06F 15/42
[52] U.S. Cl. ................................ 364/413.02; 128/630; 340/825.19; 364/413.01
[58] Field of Search ................. 128/630, 745; 434/112; 364/413.02, 413.01; 340/825.19

[56] References Cited

U.S. PATENT DOCUMENTS

| | | | |
|---|---|---|---|
| 3,781,802 | 12/1973 | Kafafian | 434/112 |
| 4,150,284 | 4/1979 | Trenkler | 364/413.02 |
| 4,406,998 | 9/1983 | Willough | 340/825.19 |
| 4,458,238 | 7/1984 | Learn | 340/825.19 |
| 4,465,465 | 8/1984 | Nelson | 340/825.19 |
| 4,565,999 | 1/1986 | King et al. | 340/825.19 |
| 4,651,145 | 3/1987 | Sutter | 340/825.19 |

Primary Examiner—Jerry Smith
Assistant Examiner—Gail O. Hayes
Attorney, Agent, or Firm—Lorusso & Loud

[57] ABSTRACT

A computer-assisted method for prescribing communication devices for non-speaking patients which is objective, and is not device-limited and functions as an effective tool for clinicians prescribing communication devices. Because the method is not device-limited, it may also be used to test the effect of design changes in device characteristics which affect the fit of the device to the user and the communication rate achieved; and enables a direct comparison to be made among devices, based on scoring the user-device pair. The method comprises the compilation of data concerning client needs and preferences as well as the client cognitive and learning characteristics; assessing the patient's motor abilities for control of devices; assessing the characteristics of a variety of communication devices; and using a computer program and specially developed formulas to integrate, compare, and assess the results so as to arrive at a communication device best suited for the client's needs.

49 Claims, 9 Drawing Sheets

1 HOUSING NVP-B013-2
2 PLUNGER NVP-B013-3
3 TARGET NVP-B013-4
4 SPRING CASSOCIATED SPRING
  RATE
  24 OZ/IN  C018-014-0750S  A
  45        C018-016-0750M  B
  83        C018-020-0750S  C
  160       C018-024-0750S  D
  340       C018-029-0750S  E
5 BANANA PLUG HH SMITH 211
6 1/16 x 1/2 ROLL PIN
7 6-32 x 3/16 SHSS (CONE POINT)
8 2-56 x 3/32 SHSS
9 2-56 x 3/32 SHSS
  (HALF DOT POINT)

NOMINAL DESIGN FORCES

|  | LOW TRAVEL 0.05a | | MED TRAVEL 0.11a | | HIGH TRAVEL 0.21a | |
|---|---|---|---|---|---|---|
| LOW FORCE | C | 4.1OZ | B | 4.5OZ | A | 4.8OZ |
| MED FORCE | D | 8.0 | C | 8.3 | B | 9.0 |
| HIGH FORCE | G | 17.0 | D | 16.0 | C | 16.6 |

METHOD FOR SELECTING COMMUNICATION DEVICES FOR NON-SPEAKING PATIENTS

This invention was made with government support under NINCDS Contract N01-NS-2-2305 awarded by the National Institute of Neurological and Communication Disorders and Stroke. The government has certain rights in the invention.

This is a continuation of co-pending application Ser. No. 07/179,653 filed on Apr. 8, 1988, now abandoned.

SUMMARY OF THE INVENTION

Applicant's invention is a computer-assisted method of assessing a patient's (sometimes called a client) needs, preferences, and cognitive and motor characteristics; including performing of three separate motor assessment protocols, each of which is intended to collect motor performance data relevant to the use of a particular class of devices; in order to assess, in accordance with predetermined criteria, functional characteristics of available communication devices; and the integration, through specially adapted software and formulas, of such data both as to patient needs and abilities and device characteristics in such a way as to provide a quantitative, experimentally justified transformation of such assessment data into a predictor of functional performance. The method operates as a tool to support clinical judgement by providing useful, patient-specific guidance informed by augmentative communication expertise.

BACKGROUND OF THE INVENTION

The present invention relates to a method for selecting communication devices for non-vocal patients (who are also referred to in the art as "clients"). In the United States today, there are more than one million people whose speech is severely impaired due to injuries, diseases, or congenital conditions affecting their neuromotor system. The most common causes of such impairment include cerebral palsy, head injury, and amyotrophic lateral sclerosis. Individuals so afflicted suffer loss or serious impairment of their vocal communication abilities due to the impairment of the muscular control of the speech mechanism, as opposed to damage to the central processing areas of the brain. In such cases, the non-vocal or severely speech impaired patient is often intact cognitivel but presents a general degradation of motor ability and coordination.

As a result of this problem, many communication devices have been developed over the years to maximally exploit the patient's remaining motor abilities in order to provide the patient with an opportunity to communicate. There are approximately 100 communication devices commercially available which are designed to aid a disabled user. These devices use different control modes, numerous control interfaces and a variety of language menus. Because of the variety of such devices, and the many types and degrees of a user's communication impairments, clinicians have experienced major difficulties in optimally choosing a communication system for a particular non-vocal patient. It is extremely difficult for a clinician to maintain an awareness of all available devices and even more difficult to compare such devices in a meaningful manner to fit the needs and abilities of individual patients.

The usual clinical solution to this problem is as follows: A clinician reviews available devices and chooses a few which appear, in the clinician's judgement, to fit the patient's abilities. The patient then tries these systems for a short period of time and based on this trial, a particular device is chosen for the patient. There are typically two steps taken by the clinician in making the choice of a non-vocal communication system. The clinician's first problem is to exclude those devices that cannot be used by the particular patient. Usually, such a decision is based on the patient's physical incapability as, for example, the patient's range of motion as it relates to the extent of the keyboard used in the device. Further, a low cognitive ability on the part of the patient may also require exclusion of some of the more complicated devices. The second step in this process is the clinician's decision as to which of the remaining devices is likely to meet the patient's specific needs best.

As can be readily understood, such a process is highly subjective. Usually, however, the initial process of excluding those devices that cannot be used by a patient works reasonably well since it can often be based on obvious physical comparisons such as identifying keyboards which may be too large for a client's reach or those with keys or switches with too much activation force.

A much more difficult problem for the clinician, however, is the basis for prescribing a particular device for a particular patient's needs once the initial exclusion process has been completed. The resulting trial and error method whereby a potential user is exposed to a number of machines for a short time period often provides only a poor indicator of the patient's long term success or satisfaction with a particular device. The potential user is not generally in a position to make sound judgments about what will be effective in meeting his or her needs, or how he or she will perform with the device over an extended period of time. Judgments about how device features would optimize a patient's use of a particular device are difficult to make because of the number of factors and tradeoffs involved. Moreover, a clinician's experience may not provide a means for making such comparisons, certainly not on an objective basis. For example, a clinician does not necessarily have any intuitive knowledge regarding how different keyboard layouts would change a patient's performance with a particular device. Further, even observations which could be easily made, would be difficult to draw conclusions from in any meaningful and complete manner. For example, the knowledge that a patient has less accuracy in the anterior-posterior direction and some visual impairment at the limit of his range of motion in the medial-lateral direction, cannot be used directly to optimize the prescription of a device.

The presently available methods for choosing communication devices to meet the needs of a particular non-vocal user are subject to many limitations and are basically subjective. Such clinical decision-making does not include a systematic assessment of those of the user's motor abilities which are specifically relevant to the use of a particular device. Further, such decision making as presently practiced does not consider a client's preferences in any exhaustive way. It also assumes that a client's performance over a short period of time will be indicative of his performance over an extended period of time. In other words, available methods do not take into account the learning process. Finally, a clinician cannot possibly consider the entire pool of devices available and therefore runs the risk of overlooking a potentially effective device.

It is therefore a principle object of this invention to provide a method for selecting communication devices for non-vocal patients which is systematic and objective.

It is a further object of this invention to provide a method for selecting communication devices for non-vocal users that is capable of embodying present clinical opinion and knowledge. It is yet another object of this invention to provide such a method which is quantitative and computer assisted for efficiency.

It is yet another object of this invention to provide such a system which is interactive in a manner which will provide a tool to assist clinicians in using their knowledge in order to prescribe effective and meaningful communication devices.

It is also an object of this invention to provide a method which is not device limited, i.e., the method is general enough to accommodate the range of existing devices as well as those yet to be developed. This feature also allows the method to be used to test the effect of changes in device characteristics which affect the fit of the device to the user and the communication rate achieved.

Finally, it is another object of this invention to provide a method that is predictive with respect to actual communication rate and user satisfaction and therefore to the amount of actual device use, and to enable a direct comparison to be made between devices based on scoring predicted performance of the user-device pair.

DESCRIPTION OF THE DRAWINGS

FIGS. 3D-3E are assembly drawings for the upper boards used in type 1 Assessment.

DETAILED DESCRIPTION OF THE PREFERRED EMBODIMENT

Applicant's method for prescribing a communication device for a patient with a neuromotor deficit affecting speech, basically comprises the following steps:

(1) Assessing the patient's motor abilities for control of a keyboard type device, where the motor ability assessing includes measuring the reach envelope ability, the actuation force ability, and the actuation accuracy ability.

(2) Assessing visual, auditory and cognitive abilities of the patient for comparison by the Guide software to minimum levels of the abilities required by each device.

(3) Assessing the dependence of patient's movement time on a set of physical parameters which covers the range of characteristics encountered in keyboard devices.

(4) Assessing the patient's visual reaction time and ability to effect switch closure and release within a range of time windows characteristic of scanning, single switch operated devices.

(5) Assessing the patient's ability to alternate switch closures by means of movements of one or more limbs or other muscles or muscle groups.

(6) Assessing the characteristics of the various communication devices, including deriving a "keystroke" history of the language item selections required for each of the devices, to produce a standard text corpus.

(7) Assessing the patient's living circumstances and preferences via responses to a questionnaire called a "Needs Questionnaire" to establish desirable characteristics of devices.

(8) Evaluating the results of the motor characteristics assessed in order to prescribe a communication device that will maximize the value of Motor Determined Maximum (MDM) Rate. This index is the ceiling on communication rate set by patient motor abilities and the keystroke history required by the device.

(9) Calculating the Benefit Score for each device from the patient questionnaire responses to determine what fraction of the client's total need will be me by the device. The Benefit Score is a weighted sum of terms representing the presence or absence of device features meeting the patient's needs.

The method is controlled and guided by software running on any IBM XT or AT compatible computer.

Figure 1:
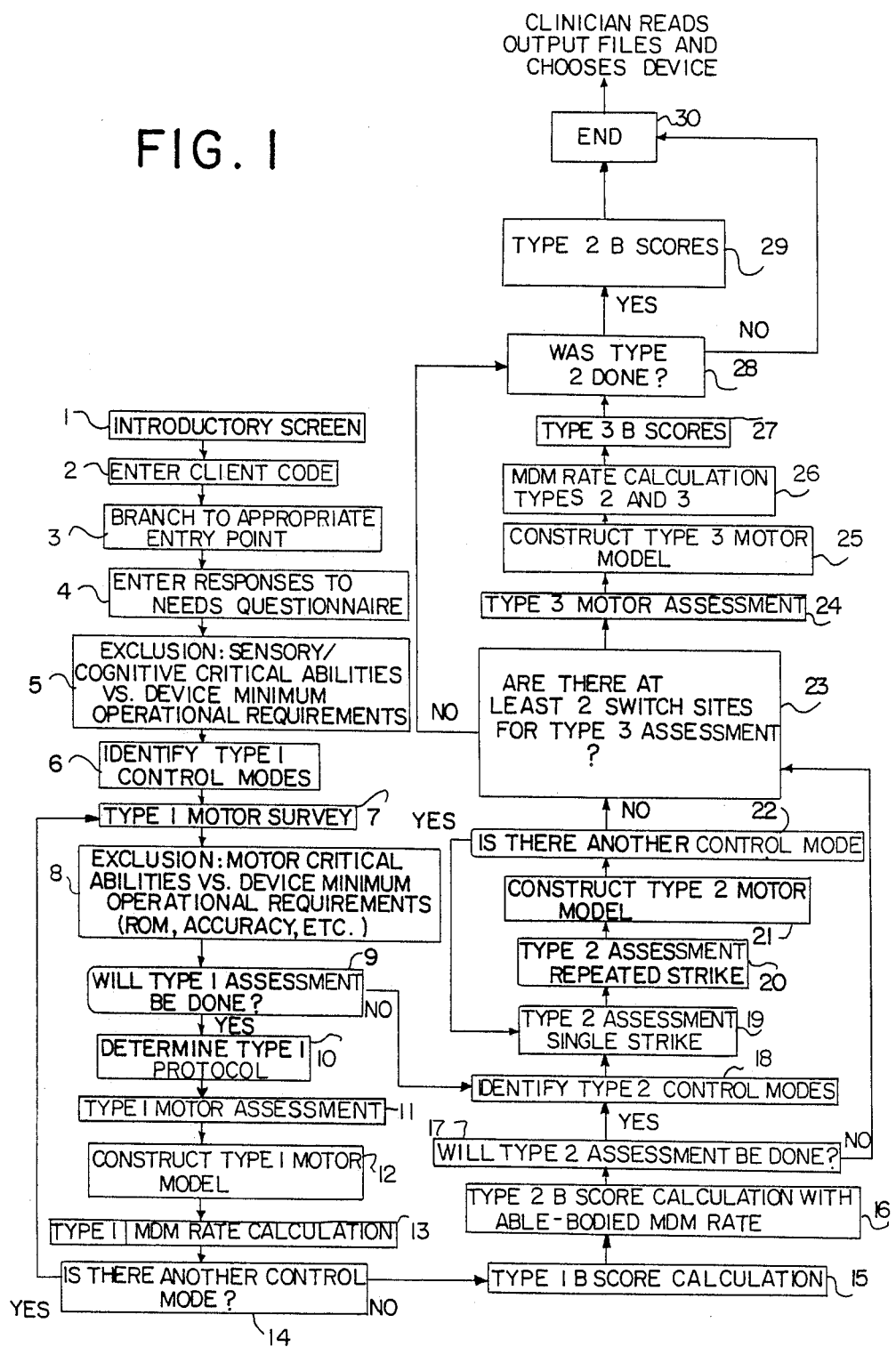
FIG. 1 is a flow chart of the method of subject invention, outlining the basic functions that are performed, utilizing what is called the "prescription guide".

The clinician enters information at the computer keyboard, including: a direct identification code (Box 2 of FIG. 1) questionnaire answers (Box 4 of FIG. 1); information on sensory and cognitive abilities (Box 5 of FIG. 1); and information on motor limits (Box 7 of FIG. 1).

Other data input to the computer via cable connection to assessment instruments (Boxes 11, 19, 20 and 24 of FIG. 1). Once assessments are complete, the system provides the clinician with the results of Benefit Score (Boxes 15, 27 and 29) and MDM Rate (Boxes 13 and 26) calculations which the clinician uses to make prescriptive decisions.

PRESCRIPTION GUIDE SOFTWARE

Applicants' method for prescribing a communication device for non-vocal patients is outlined in FIG. 1. In the preferred embodiment, the method employs a software package called the "Guide" program which consists of approximately 178,000 bytes of source code written in the "C" language and compiled using a Lattice C compiler. The over-all language used is Lotus 1-2-3 operating in conjunction with available computing devices. The language, computer, and interfaces are known and available to those skilled in the art.

The Guide program utilized in the performance of applicants' method is written to provide five basic functions:

prompting the clinician to enter necessary information at the keyboard, and to prepare and connect assessment equipment at the times when it is needed;

acquiring and filing data from motor assessment instrumentation via an interface (an external circuit box) and a Data Acquisition and Control Adaptor such as is available from IBM (a circuit board installed in the computer);

comparing client and device information to determine whether criteria for exclusion are met, and presentation for approval of "recommendations" over which the clinician has veto power;

modeling of client motor abilities and Needs and calculation of the match scores for each device; and preparation of the output files which the clinician will print or view on the computer screen as the basis of his/her prescriptive decision.

At the two stages in the execution of non-interactive aspects of the Guide program where output files are generated (Boxes 16, 27 and 29 of FIG. 1), control is relinquished by the C program to command "macros" which run in Lotus 123 spreadsheets. Because of this, the computer used must have Lotus 123 installed (and have the Lotus system disk in the floppy disk drive during use of the Prescription Guide unless Lotus 123 has been installed with the option that makes use of a "key disk" unnecessary).

The functioning of the Guide software depends on a simple subdirectory structure which is set up by an installation program, provided with the Guide software, on the computer's hard disk prior to the first use of the Guide. The subdirectory off the DOS root directory is called RX. It is here that the control program for the Guide resides. Three subdirectories off RX are also set up, one for INPUT, one for OUTPUT, and one for LOTUS. These serve to organize the files and the Lotus macro spreadsheets on which execution of the Guide's calculations depend.

OUTPUTS OF THE PRESCRIPTION GUIDE

The outputs of the Prescription Guide provide MDM Rate and B (Benefit) scores as quantitive measures of the match between the patient and each of the devices from its disk files that has not been excluded. Detailed coverage is given below to the format and content of the output files prepared by the Guide. The clinician and patient may choose to base decisions on the total B score or on subscores for categories of function considered to be priorities for the client.

There can be up to six possible answers to each of the 151 questions in the Needs Questionnaire (whose function and composition is later described), and thousands of data points are collected in the motor surveys and assessments. Making a prescriptive decision taking into account anything like this much patient information and a comparable amount of data about each device is feasible only because of the compacting of those results into the relatively small number of scores presented in the output files. While there may be tradeoffs when devices rank differently with respect to MDM Rate and B, this problem is greatly reduced relative to its magnitude in unassisted prescription.

LOGIC FOR NARROWING THE FIELD OF CANDIDATE DEVICES DEVICE EXCLUSION LOGIC

To arrive at a list of devices for which scores are presented in the output files, the method of FIG. 1, utilizing the Guide program uses a process of elimination. It does not proceed by gathering the complete body of assessment information and then selecting devices which are consistent with the patient's abilities; rather it makes periodic decisions during the course of the procedure concerning the exclusion from further consideration of devices which do not meet certain critical requirements (Boxes 5, 8, 9, 17 and 23 of FIG. 1). This logic has the potential to substantially shorten the time required for completing the procedure for two reasons: it may lead to elimination of motor assessment components which do not apply to the devices which remain in contention; and it reduces the time which must be devoted by the Guide software to calculation of the user-device match scores.

The first major exclusion step follows immediately after the client's sensory and cognitive abilities are entered, early in the method of FIG. 1 (Box 5). A device is excluded here, regardless of its type, if the patient's level of any of five "critical abilities" falls below the device's minimum operational requirements. These critical abilities are defined by the scores the patient attains on the three cognitive assessments, by a simple three-level rating of his/her hearing, and by his/her visual acuity as measured by the standard Snellen (eye chart) test.

The operational requirement for visual acuity is specified as the maximum value of the "Snellen denominator", e.g. 40 in "20/40", that may be characteristic of a user's vision in order that the smallest characters may be read comfortably in average viewing conditions. For a given device, its minimum operational requirement—maximum Snellen denominator, S—is derived using the formula $S=20H/H^*$ where H is the measured smallest character height (in the language menu or output display) and $H^*$ is a constant which represents the character height which requires that $S=20$, i.e. requires perfect vision (as corrected by spectacles when applicable). The value of $H^*$ was chosen to be 2 mm and assumes a standard device use distance of 30 cm. This is intentionally somewhat smaller than what one finds in the human factors literature because informal tests suggest that 2mm is an acceptable size under most room lighting conditions, because in tact a user might adjust to small characters by using the device at a smaller distance, and because it is the intent that the Guide err by including a marginally usable device rather than by recommending exclusion with only marginal justification.

If the comparison of critical ability values to operational requirement files shows that one or more devices is likely to be unusable by the patient (client), it will report that it "recommends" their exclusion and the reasons why. For example, the Guide will recommend that a device which requires learning of lengthy codes for a large number of language elements be excluded from consideration for a client who achieved a low score on the Code Learning Test. Any exclusion recommendations made at this point may be overridden by the clinician. The decision to permit this veto power in the present version of the Guide was based on the awareness that the research which would be needed to rigorously confirm the investigators' judgements and preliminary data concerning the cognitive operational requirements of devices has yet to be undertaken.

Exclusion of devices also takes place after completion of the motor survey for each control mode prior to Type 1 motor assessment (Box 8 of FIG. 1). The client's range of motion, accuracy, force production ability, and end effector tip size are assessed prior to starting the instrumented assessment for each position/body part/action combination identified by the clinician as appropriate for the key-to-key movement assessment. The measurements made in this survey (and keyboard-entered by the clinician) are used for comparison to the motor operational requirements of devices still in contention. This provides a basis for further exclusion. Since the basis of this exclusion is somewhat more objective than for cognitive exclusions, the clinician does not have veto power over it.

No exclusion of devices takes place as a result of the Types 2 and 3 motor surveys. The reason for this is that the switches used for scanning communication devices (to which the results of Type 2 assessment pertain) and for body-distributed-switch encoding devices (to which Type 3 applies) are external to the device proper and are assumed to be chosen by the clinician to be easily operable by the client. In fact, the trial and error selection of appropriate switches that occurs during the motor surveys for these assessments is directed precisely at identifying the switches which are expected to be optimal for each selected body part during device use.

In addition to device exclusion, there are circumstances under which a whole class of devices may be ruled out along with the motor assessment which is associated with it (Boxes 9, 17 and 23 of FIG. 1). If the motor survey conducted prior to Type 1 assessment reveals an insufficient range of motion for a given control mode to permit use of keyboard-like devices, Type 1 assessment will be excluded for that control mode along with all Type 1 devices. If only one control mode has been specified or if range of motion is insufficient in all control modes, Type 1 assessment will not be performed at all.

If Type 1 assessment is performed, its results may be the basis for rejecting Type 2 devices as a group and therefore excluding Type 2 assessment. To appreciate the reasoning, definitions of the two client-device match scores alluded to above are necessary. The Guide calculates "MDM Rate" from motor assessment data and device characteristic files (Boxes 13 and 26 of FIG. 1). This score represents the motoric upper limit on the rate in words per minute at which the client/control mode could communicate with a particular device once he/she had become expert in its use. From the answers to the client Needs Questionnaire and other device files, the Guide derives "B", the Benefit score which is meant to be predictive of satisfaction and use by scoring the extent to which a device's features meet the communication Needs of the client. Calculation of B includes the MDM Rate value as one factor.

It will be seen in the flowchart in FIG. 1 that the calculation of MDM Rate and B for Type 1 devices (Boxes 13 and 15) is completed by the Guide software before Type 2 assessment. This sequence is intentional since it allows comparison of the scores derived for Type 1 devices to the best that might be obtained with scanning (Type 2) devices. To establish the latter, the Guide software calculates MDM Rate for each scanner using files of composite able-bodied Type 2 assessment data and calculates B for each of these devices using the client's own Questionnaire answers and the able bodied MDM Rate values (Box 16 of FIG. 1). Type 2 assessment can legitimately be excluded if there is any Type 1 device which attains both a higher MDM Rate than the able-bodied Rates calculated for all scanners and a higher B score than those calculated (with able-bodied rates) for all scanners. The logic is that there is no point in considering Type 2 devices if it can be established that the client in at least one control mode can do better in all respects with a keyboard-like device than with the best scanner controlled with speed. If the Guide does recommend exclusion of scanners, the clinician is given the opportunity to override this recommendation.

BENEFIT CALCULATION

As previously mentioned, and in accordance with the invention, after an introductory screening, the Needs Questionnaire is administered to the client by the clinician to determine the living situation and aspirations of the client.

Figure 2:
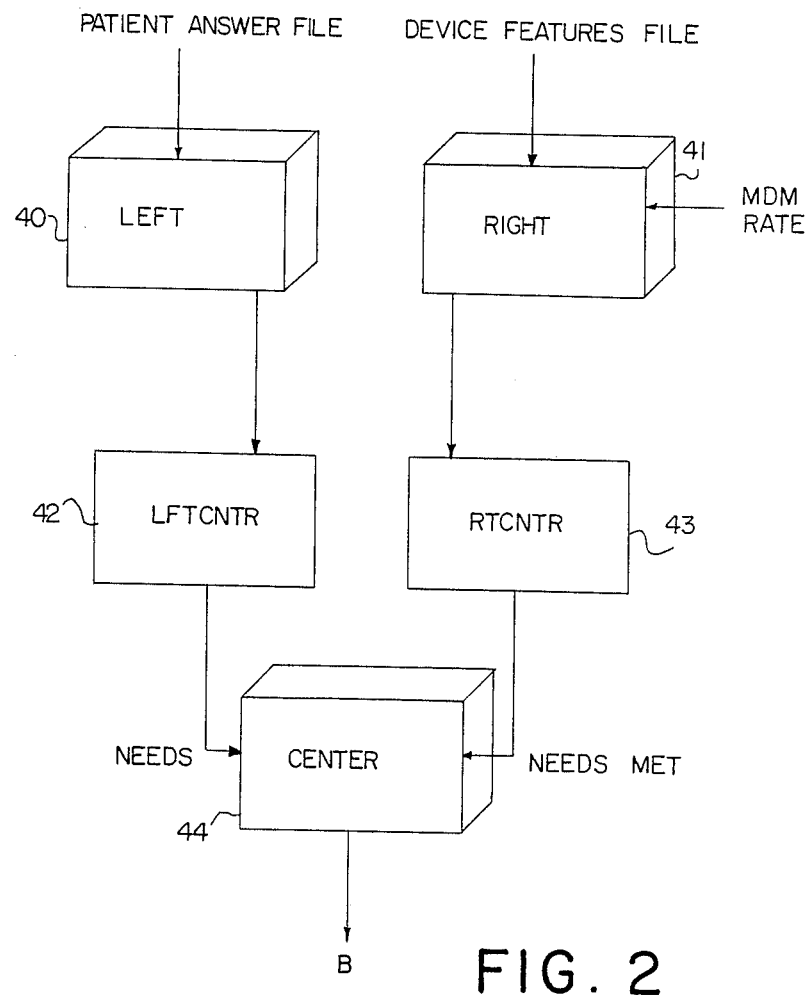
FIG. 2 is a flow chart which outlines the steps leading to the calculation of the benefit score used in applicants' invention.

The patient answer file is loaded, as shown in the block diagram of FIG. 2, into a spreadsheet called LEFT (Box 40). Formulas convert these answers to a column of Weights and a column of Needs, the client's Needs Profile. The transformation here is from approximately 475 possible answers to the questionnaire to 96 Needs and their weighting values. It is important to note that questions to the client are phrased in terms of his preferences and circumstances. Formulas then process this information to determine presence and level of need for technological features of devices. The device features file and MDM Rate are loaded into a spreadsheet called RIGHT (Box 41). Here formulas convert features into a Needs Met column. This takes about 350 possible features and maps them into 96 Needs Met. For example, a device may receive a 1 in "very easily relocatable", indicating that a device meets this Need. This rating derives from a formula which operates on features such as size, weight, number of components and presence of a shoulder strap, clip or a handle.

These three columns, Needs, Weights and Needs Met along with their corresponding columns of labeling text are put into a spreadsheet called CENTER (Box 44) through the use of two intermediate spreadsheets, LFTCENTER (Box 42) and RTCNTR (Box 43). It is important to note that there is a one-to-one mapping between Needs and Needs Met in CENTER (Box 44). The Benefit score, B, is calculated in the CENTER spreadsheet using the formula:

$$B = \text{Sum}_i [W_i(N_i \text{ AND } NM_i)] \quad (1)$$

where $W$ = weighting factor, $N$ = need, and $NM$ = need met.

The Benefit Score is calculated for each device from patient questionnaire responses to determine what fraction of the client's total need is being met. The client would receive the maximum benefit if the device satisfies all of the client's needs, i.e.:

$$B\text{Max} = \text{Sum}_i (N_i \times W_i). \quad (2)$$

The relative benefit to the patient is a weighted sum of terms representing the pressure or absence of device features meeting the patient's needs, and indicates that portion of the needs which the device will meet. Relative benefit is expressed as:

$$B\text{Rel} = B/B\text{Max} \quad (3)$$

CLIENT QUESTIONNAIRE AND CALCULATION OF NEEDS

The Needs Questionnaire was developed to serve as one of the instruments for obtaining the patient-or-client-specific information necessary for carrying out the automatic comparison and Benefit scoring of potential user-device combinations.

In responding to the Needs Questionnaire, the clinician decides when to use her/his own judgment about the client, when to put questions to the client directly, when to take account of judgements and information provided by family members or other people who know the client well.

The primary motivation for the development of the Prescription Guide is to provide support for the clinician who is herself or himself not necessarily a specialist in augmentative and alternative communication. In addition, the Guide is meant to be useable with newly non-vocal clients, or clients who have not previously used a non-vocal communication technique, as well as with clients who are seeking re-evaluation. The Questionnaire therefore has been worded in terms of judgments and observations that could be asked of people unfamiliar with the available technology and its implications. At the same time, the questions were designed to elicit the information required for the determination of the relative usefulness of device features.

The questionnaire consists of nine sections:
1. Basic information
2. Speech
3. Position and mobility
4. Device operation
5. Attitudes and preferences
6. Activities
7. Environment
8. Professional support
9. People with whom the client interacts In total, it contains 151 items, for each of which 2 to 6 response choices are offered. The responses selected constitute the client-specific data on which the formulas in a Lotus 1-2-3 Worksheet called "LEFT" operate to determine the presence and importance of Needs as shown in FIG. 2. The Questionnaire is not limited to any specific number of questions and the number may be modified or adapted as circumstances require. A typical questionnaire is included here as Table 1.

PROCESSING OF CLIENT QUESTIONNAIRE

The responses selected by the clinician to the Needs Questionnaire provide a representation of the information about the client which is relevant to determining which of the communicative Needs that technology can address are applicable to him or her. Each Need formula in the LEFT worksheet (Box 40 of FIG. 2) examines the answer cells where the presence of a 1 (indicating that that answer was selected) affects the computation of the formula's value. If the formula is computed to be non-zero, that Need is scored as being present for that client. The other types of formula in the LEFT worksheet, whose functions are discussed below, operate in the same way.

In the calculation of the Benefit score, which reflects the suitability of each communication device for the client who is being evaluated, close to 100 different communicative Needs are taken into account. Formulas written in the adapted Lotus software determine whether each Need is present or not for the client. The formulas refer to the client's and clinician's answers to the Needs Questionnaire. A second set of formulas uses the Needs Questionnaire responses to assign an importance rating to each Need. The Need Weights formulas award a score of 10 (maximum), 2 or 1, depending on whether the client's circumstances make this a highly important Need, a moderately important Need, or, in the default case, a Need which is not very important, compared to the others.

These Needs and Need Weights formulas embody judgements concerning how a client's circumstances determine his or her communicative Needs. Some of these formulas are quite simple in structure (e.g., if x, then number), and others are quite complex (e.g., if a and (b or c or d), then number n; if e and f, then number o; otherwise, number p), and lengthy. As it stands, many more than 200 judgements (equal to one simple condition for each of the approximately 200 formulas in this component of the system) are expressed regarding the presence and relative importance of communicative Needs which can be met by current communication device technology.

In order to arrive at decisions as to which score should be assigned to which combinations of circumstances, the following approach is used: Each need is treated as a separate problem. All circumstances that could result in an outcome of a higher-than-minimum importance score for it are assessed. The circumstances which could justify its being particularly important are reviewed, and the relevant Questionnaire answers noted in the formula. The formula is then constructed so that it looks for the answers to these crucial questions first. On the basis of these answers, it determines whether or not a weight of 10 is to be awarded. It not, it goes on to look at the answers given to a second set of questions, in order to determine whether the necessary conditions have been met to warrant giving a weight score of 2. If neither of these scores is justified, that Need receives the default weight, 1. If this client does not have this Need (i.e., the Need formula has given it a zero), the Need weight is multiplied by zero, and the Benefit score is not incremented. The availability of AND's and OR's in Lotus provide complete flexibility to represent the combinations of circumstances and alternative conditions which determine the weights.

The total list of client Needs is divided into 14 Functional Categories, with each Need belonging to only one category. Some categories (e.g., electronic output) contain a large number of Needs, some (e.g., privacy) only one or two. Following is the list of categories:
1. Flexibility of operation
2. Portability
3. Ease of learning for user
4. Communication rate
5. Menu flexibility
6. Reliability
7. Electronic output
8. Appearance
9. Privacy
10. Ease of set-up
11. Ease of learning for receiver
12. Ease of maintenance
13. Environmental control functions
14. Unlimited vocabulary Each of the approximately 100 Needs is rated as present or not, and then assigned one of 3 different levels of weight, by means of formulas operating on client-specific information obtained using the Needs Questionnaire. This has the effect of assigning each Need to one of 4 bins, the 10-point, 2-point, 1-point or 0 bin.

One potential problem with this 4-level rating system is the following: there is a bias in favor of a Functional Category comprising a large number of Needs. For example, category 11, Ease of learning for receiver, includes the Need for very legible display (which concerns characteristics of the font), easy to read display (which covers such features as not breaking words at the end of a line), two levels of ease of learning for the receiver and mental load in use for the receiver, five Needs in all. A maximum score of 50 is thus possible for that Functional Category. In contrast the Functional Category of Unlimited vocabulary is represented by only one Need, the need for an alphabet as part of the device menu. If the total Benefit score for each device were simply reported as the sum of the Need-times-Need Weight products, a device which does not provide Unlimited vocabulary at all but meets all the Ease of learning for receiver Needs could receive a higher B score than a device which does provide the alphabet, but fails to meet two or more of the Ease of learning for receiver Needs.

An additional step has been taken in order to provide some guidance, based on clinical experience, concerning the relative importance of these Functional Categories. Several experience clinicians were asked to rate the importance of each of these Functional Categories on a 10-point scale, for each of four (artificially constructed) client profiles. The correlations among the clinicians were measured, and a group of clinicians who showed significant agreement identified. These clinicians' responses were analyzed to determine which client characteristics (from the profiles) accounted for differences in the ratings assigned to the Functional Categories. For example, a poor medical prognosis was seen as dictating a high level of need for Functional Category 1, Operational flexibility. The client information which determines the Functional Category Weights is obtained in the Needs Questionnaire, and, in the same manner as the Needs and Need Weights formulas described above, Lotus formulas are employed to reference the Questionnaire answers and assign the appropriate weights to the Functional Categories.

Individual Need scores and Functional Category scores are combined as follows: The Functional Category Weights determine the size of the pie wedge' (where the pie is the total Maximum Benefit score) of importance assigned to each category relative to the others. The individual Need scores (10, 2, 1 and 0) assigned by the Needs and Need Weights formulas determine how much of each category's wedge' is added to the score. For example, if 4 out of 5 of the Needs which make up the Ease of learning for receiver category are each awarded a score of 10, the score for that category is 4/5ths of the Ease of learning for receiver category weight. If the client is scored as having the need for an alphabet as part of the menu, but the weight is calculated as 2, 20% of the Unlimited Vocabulary category weight score is awarded. These scores are totaled to make up the Maximum Benefit score, the highest score which an ideal device for that client could obtain.

The output of the Prescription Guide reports the individual Benefit subscore for each Functional Category, in addition to the total Benefit scores. The clinician and client and others directly concerned can then opt to make use of the overall Prescription Guide recommendation (the device with the highest total B score) or decide to use their own judgement as to which functional categories to prioritize most highly. For example, if they are convinced that portability is the prime issue for this client, they may wish to restrict their consideration to those devices which score highly in that Functional Category.

Clinician and client also have the option of looking at the Need level, since the output includes the list of Needs which the client is scored as having and indicates which of these Needs are met and which are not met by each device.

DEVICE EVALUATION AND CALCULATION OF NEEDS MET

Devices are evaluated under the categories of maintenance, setup, operation, menu, visual output, flexibility of output, portability, connectability, flexibility of operation and auditory output. Features such as battery life, volume adjustability, and whether the device has an RS232 port or a user operated print key are measured or observed. The device features file is input into the RIGHT spreadsheet (Box 41) of FIG. 2.

The following are representative samples of device Features of each type.

Objective measurements:
- battery life, i.e. time between charges or replacements
- printed circuit board thickness
- number of ways to connect cables between components
- maximum and minimum dwell times for keyboard actuation
- number of words available in the language menu
- luminance of optoelectronic output
- smallest distinguishing feature of hard copy characters
- maximum volume of speech output 1/0 entries (objective):
- the printed circuit board is epoxy-fiberglas (or not)
- the company provides a service network
- the device is non-electronic
- the device is joystick operable
- the printed output has a continuous character font
- the speech synthesizer offers spelled speech.

Subjective ratings:
- cognitive difficulty of changing the battery, three levels
- dexterity required to change the paper, four levels
- clarity of the manual on the subject of user programming
- adequacy of the case fasteners, five levels
- clarity of the connector labels, four levels
- resemblance to a toy, yes or no.

The list of features includes approximately 300 items. Not all items apply to all devices, however. No entry can be made, for example, for "maximum scan rate" for a device which is not a scanner. The convention applied consistently is that no entry is made for Features which do not apply to a device. Although Lotus formulas will read a blank as zero, the formulas in the RIGHT spreadsheet were uniformly written to establish that a Feature does apply before using its value to calculate a value for a Need Met.

Device features are processed by the RIGHT spreadsheet as shown in FIG. 2. The organization of the RIGHT spreadsheet is shown below. It is made up of six columns whose headings are listed here as they would appear reading from left to right:

"Needs Met"—text entries which define communicative Needs met or not met by a device and indicate the meaning of the numbers in the cells to their right;

Needs Met—formulas which take on and display the value 1 or 0 indicating that the Needs defined by the text labels to their left are or are not met, respectively;

"Specifications Met"—text entries which define device properties which are convenient independent variables for more complex Needs Met formulas and indicate the meaning of the numbers in the cells to their right;

Specifications Met—formulas which take on and display the value 1 or 0 indicating that the Specifications defined by the text labels to their left are or are not met, respectively;

"Features"—text entries which serve as labels for the numerical entries to their right;

Feature Values—values for each feature imported from the DEVICES file.

The transformation of device Feature files into Needs Met profiles occurs from right to left, Feature values being read into the rightmost column and the profile being calculated in the leftmost column of formulas. The Specifications Met formulas are a device meant to facilitate composition, editing and readability of Needs Met formulas by defining variables which themselves depend on more than one Feature and have a more function-oriented character. For example, the formula which determines whether the need is met for "ambulatory portability", depends on whether specifications are met for ambulatory size, weight, carryability, battery life (if applicable), and durability. Each of these specification formulas yields a 1 or a 0 according to whether some logical combination of numerical conditions is met by a group of features. The formula for ambulatory carryability, for example, assigns a 1 to a device if the number of components if 1 or 2, and the device is equipped with a handle, belt clip, shoulder strap, or carry case. To have included all the Features and logical/mathematical elements of the Specs Met formulas in the formula for ambulatory portability would have resulted in an equation difficult to understand and quite possibly longer than the 240 character limit set by Lotus.

In each Needs Met cell is a formula which returns a value of 1 or 0 according to whether the Feature values for a particular device do or do not justify the claim that that Need is met. The simplest form a formula can take is simply the value of a single 1/0 Feature. For example, the Need is Met for an auditory attention getter if the Feature "aud attn gtr" has the value 1, i.e. is present. Provision for wheelchair mounting similarly depends on a single Feature.

Another simple functional form is dependence on a single Feature which may take on a continuous range of values. In such cases, that Feature is tested to establish whether its value is on the desirable side of a threshold. For example, the Need for high intelligibility auditory output is considered met if the "spch intlgblty" Feature has a value greater than or equal to 90 (out of 100). Similarly, the need for cold insensitivity is defined as met if the "min op temp" is $< = 40$ degrees F. This form may be extended by comparison of mathematical functions of Features (or Secs Met) with thresholds. For example, in the formula which establishes that the need for a multiple sentence length buffer is met, the capacity of the auditory buffer in language units is divided by the "linguistic cost" (number of units needed to compose a word, on average) and this quotient, representing the buffer capacity in words, is compared with 100.

These two simple forms are often generalized and combined by means of logical combinations. For example, the need for keyboard tactile feedback is treated ad met if "actn frce" > 100 grams and "key trvl" > 2 mm; or the keys have "overcenter action" (i.e. yield abruptly during the final part of their travel). The format imposed by Lotus 123 requires that each logical operator be preceded and followed by the number sign, #, e.g. #OR#.

When the formulas for a Need Met must take on a different form depending on whether some condition is met, the IF function is invoked. Its format in Lotus is @IF(a,b,c), meaning "If a is true, i.e. has the value 1, then the formula takes on value b; otherwise it takes on value c". The terms a,b, and c, may have any of the forms described above and, in fact, may themselves be IF expressions. In the formula for easy programmability for example, if programming is self-guided, the device is awarded a 1; if not, an expression involving several other aspects of programming must exceed a threshold value.

MOTOR ASSESSMENT AND CALCULATION OF MDM RATE INTRODUCTION AND RATIONALE

The motor assessment consists of three separate protocols referred to as assessment Types 1, 2, and 3 (Boxes 11; 19 and 20; and 24; respectively, of FIG. 1). Each type is intended to collect motor performance data relevant to the use of a particular class of devices. Type 1 requires the client to perform tasks which are predictive of performance using "keyboard" devices, i.e. systems which are controlled through a planar array of keys or touch locations. This category, includes both direct selection and encoded devices. Type 2 assessment measures aspects of operation of a single switch which influence the rate at which the client could communicate using a scanning device. Type 3 assessment provides measurements which are predictive of communication performance for encoded devices using up to eight switches placed at sites on the client's body where s/he can most easily operate them.

The following principles apply to all components of the motor assessment:

1. All components of the motor assessment are instrumented; they are conducted using switches which are connected to an interface which communicates directly with the computer. While a very large amount of data is collected in the three assessments, the recording of this data and its transformation into MDM Rate values is completely automatic, requiring neither keyboard entry nor manual calculations.

2. Because the goal of the motor assessment is the prediction of the client's Motor Determined Maximum Rate using each device which has not been excluded from consideration, all the recorded data consist of time measurements. MDM Rate is designed to be a cumulative functional index of the effect on the client's performance times of the motoric demands imposed by device use.

3. All three Types of assessment are conducted with test equipment developed for this purpose and available in the art rather than communication devices themselves. Each assessment is designed to evaluate the kind of motor act which is the elemental component of use of a particular class of device. The basis for identifying these unitary motor tasks and the variables which determine how rapidly they are performed is simple observation of functional communication with each of the three classes of devices.

4. The assessments were designed to be nearly free of cognitive demand. The MDM Rate value calculated for a device from the assessment data represents the ceiling set on expert performance by the client's motor abilities. The intent is to obtain a score for the motoric match between client and device which is a better prediction of rate after long term use than measurements made in brief trial use of a device in the clinic. The underlying hypothesis is that the overlearning which comes with familiarity and practice will reduce the ongoing cognitive demand of device use to the point where the client's motor abilities set the limit on rate. It is recognized that the cognitive demands of devices differ and that a refined prediction of functional rate might be derived by taking account of the differences among devices in mental load of operation and the differences among people in cognitive abilities.

5. The motor component of the Prescription Guide of FIG. 1 is intended to make efficient use of clinical time and skill and to provide a quantitative, experimentally justified means of transforming assessment data into a predictor of functional performance. It is intended to support clinical judgement by providing useful, client-specific guidance informed by augmentative communication expertise. In particular, the knowledge, experience, judgment, and trial-and-error which are essential to establishing what combinations of position, adaptive equipment (e.g. mobile arm supports), body parts and actions represent the best candidates for motor assessment is as important in prescription using the Guide as without.

TYPE 1 ASSESSMENT: DESCRIPTION AND RATIONALE

Use of keyboard (this word is used throughout to signify interfaces consisting of planar arrays of mechanical keys, touch panel locations, light-sensitive panel locations, paper letter board cells, and the like) devices by the client population this method addresses is virtually always accomplished serially using a single end effector, e.g. one finger, a knuckle, a headstick, or a foot. Composition of a message may be resolved, therefore, into a sequence of key-to-key movements. What sets a motoric limit on communication rate is the time required to perform each of these movements and complete switch closure (if any is required).

Type 1 assessment (Box 11 of FIG. 1) consists of a sequence of tasks in each of which the client is required to move repeatedly between two targets whose position, size, required force, and travel required for switch closure can be varied from task to task. The values taken on by the task variables over the course of the full assessment protocol are meant to span the range of each variable of which the client is capable and to provide enough combinations of values that no important feature of the client's performance is overlooked.

The Type 1 task variables are defined as follows:

A = movement amplitude, measured in inches between target centers.

W = target width, the diameter in inches of each circular target.

$\frac{1}{4}$ = movement angle, measured with respect to principal axes of the test panel; takes on values 1 through 8 representing multiples of 45 degrees increasing clockwise starting with the direction most nearly toward the client.

F = force required to fully depress the target causing switch closure, measured in oz.

Z = travel of the target perpendicular to the test panel necessary to effect switch closure, measured in inches.

Each task consists of twenty movements reciprocally between a pair of targets. Possible target positions are radially opposed to each other in a circular pattern. The instruction to the client is to move as rapidly as he/she can without missing the target. Inaccuracy is penalized only as it affects measured movement time. If the client is repeatedly missing the target, he/she is cautioned to go slower and the task is repeated. The purpose of requiring ten movements in each direction is to obtain a reliable estimate of the client's mean performance. It was noted in our pilot studies that significant fatigue effects were not observed over twenty movements and that some acceleration was often seen over the first few movements.

The Type 1 protocol consists of up to 100 tasks. Based on pilot testing of earlier versions of the protocol, it was established that this number represents a reasonable compromise between the need for substantial numbers of data points to support the modeling on which MDM Rate calculation is based and the need for a practically short assessment. Since the disabled subjects in applicants' pilot studies typically required one to two hours to complete a Type 1 protocol consisting of 36 tasks, the 100-task protocol can be expected to require between three and six hours of testing. It is anticipated that three or more assessment sessions will be required and the Prescription Guide control software allows for interruption and resumption of testing as needed.

Even if A, W, F, and Z are each allowed to take on only three values, it may be seen that an exhaustive protocol which tests all combinations of these values at each of four directions (pairs of reciprocal 0 values) becomes prohibitively large with tasks of the magnitude of: $(3^4) \times 4 = 324$ tasks This problem is surmounted by using a "central composite design" which tests the subject at the boundaries and in the middle of the task space. Each variable takes on its two extreme values while the others remain at their intermediate value. This set of combinations plus the combination of intermediate values of all n variables accounts for $2n + 1 = 9$ tasks. In addition, all combinations of the two extreme values of each variable are included, accounting for an additional n = 16 tasks. If these 25 tasks are performed at each pair of 0 values, a 100 task protocol is obtained.

The values of the task variables provided by the test panel and the target set are as follows.

A: 1.5, 3, 6, and 12 inch inter-target distances are available if the movements are centered in one of the four corners of the test panel. The group of target positions centered on the center of the panel includes A = 24 as well.

W: Target diameters are 0.5, 0.75, 1, 1.5, 2, and 2.5 inches.

F: Actuation force values of 0, 2, 4, and 8 ounces are available.

Z: 0.05, 0.1 and 0.2 inch values of switch are provided at each of the values of travel, and 0 travel is available at $F=\theta$.

$\theta$: Eight values are available at 45 degree intervals. All values of A are provided at each value of $\theta$ (with the exception of 24 inches which is present at all $\theta$s only in the center group of target positions).

These values were chosen with reference to the sizes and switch characteristics of existing devices in order that calculation of MDM Rate for a device not require significant extrapolation beyond the values used in assessment.

The Type 1 equipment consists of a set of switches and a test panel into which the switches may be inserted at a fixed set of locations. The panel consists of a lower board which is wired to connect pairs of switches with the two channels of a capacitive switch circuit (provided by George Kondraske of the University of Texas at Arlington) mounted underneath, and an upper board 1.5 inches above it which locates and stabilizes the bodies of the switches. The lower board is a 28 in square of ⅜in polycarbonate plastic (Lexan) which is mounted in a fixed position and orientation with respect to the client. Five circular patterns of holes are drilled in this board, one centered in each quadrant and one centered on the board as a whole. The holes are fitted with standard banana jacks all of which are wired to one or the other of the two capacitive switch channels. The upper board is a 26 in square of 3/16 in Polycarbonate and couples to the lower through plastic standoffs and banana plugs which mate with unwired jacks. Two patterns of holes are drilled in the upper board, one pattern in one quadrant and the other in the center. The upper board is easily lifted and rotated to make the corner pattern coincide with the desired set of wired holes in the lower board. The panel is located for assessment in order to center one of the hole patterns on the range of motion of the end effector being assessed. The ease with which the upper board can be lifted and turned is intended to accommodate future clinical and experimental protocols which utilize movements in more than one hole pattern. The present protocol limits its tasks to movements centered in one of the patterns of holes.

Figure 3A:
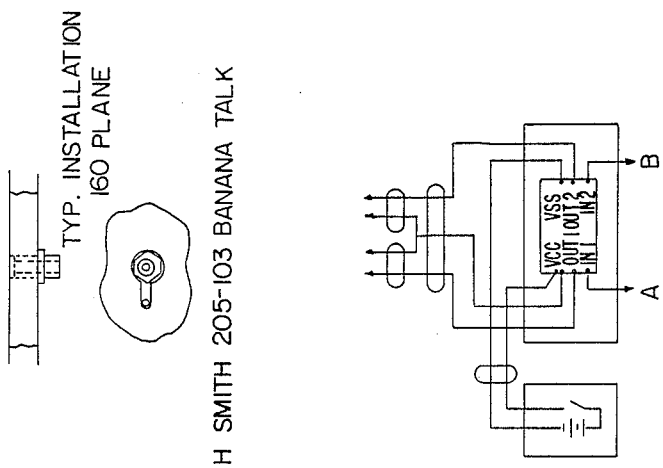
FIGS. 3A-3C are assembly drawings for the lower boards used in type 1 Assessment.
Figure 3A:
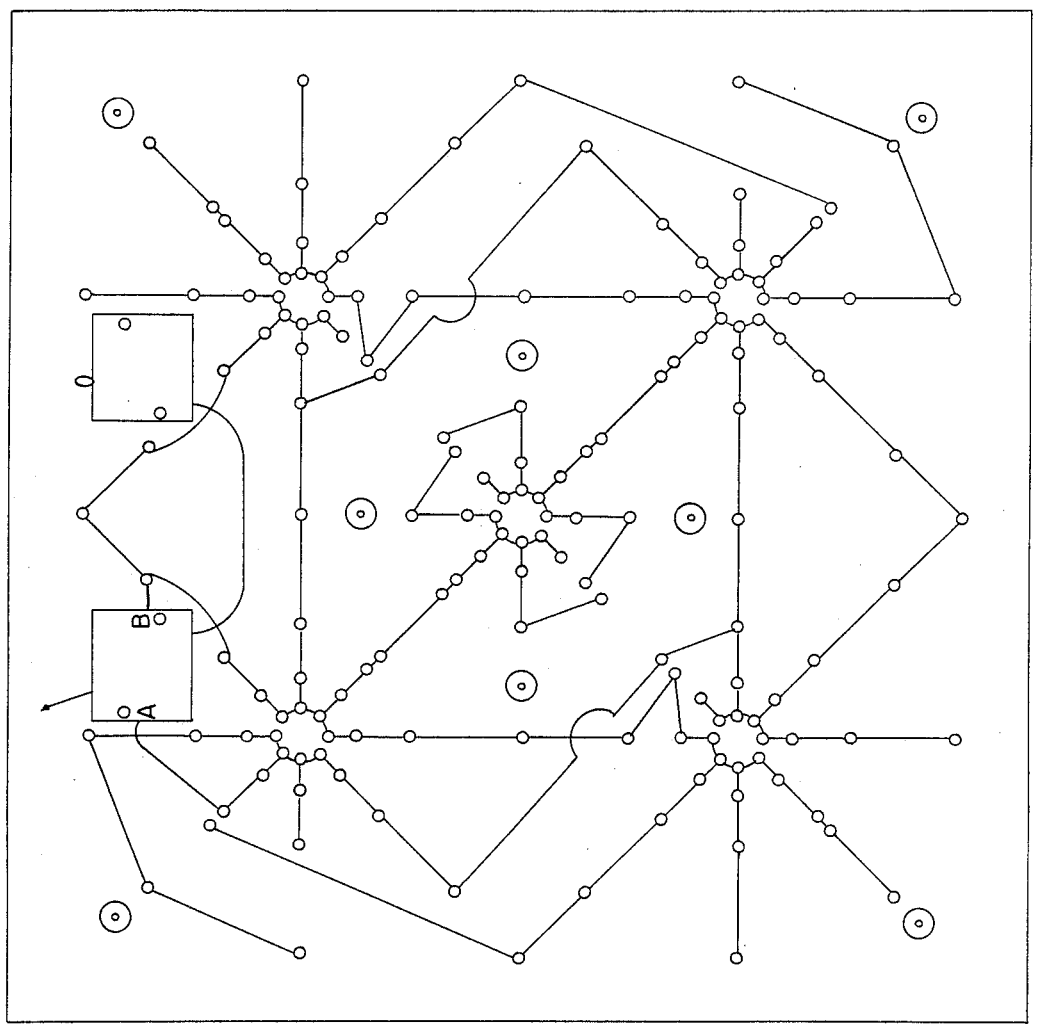
Figure 3B:
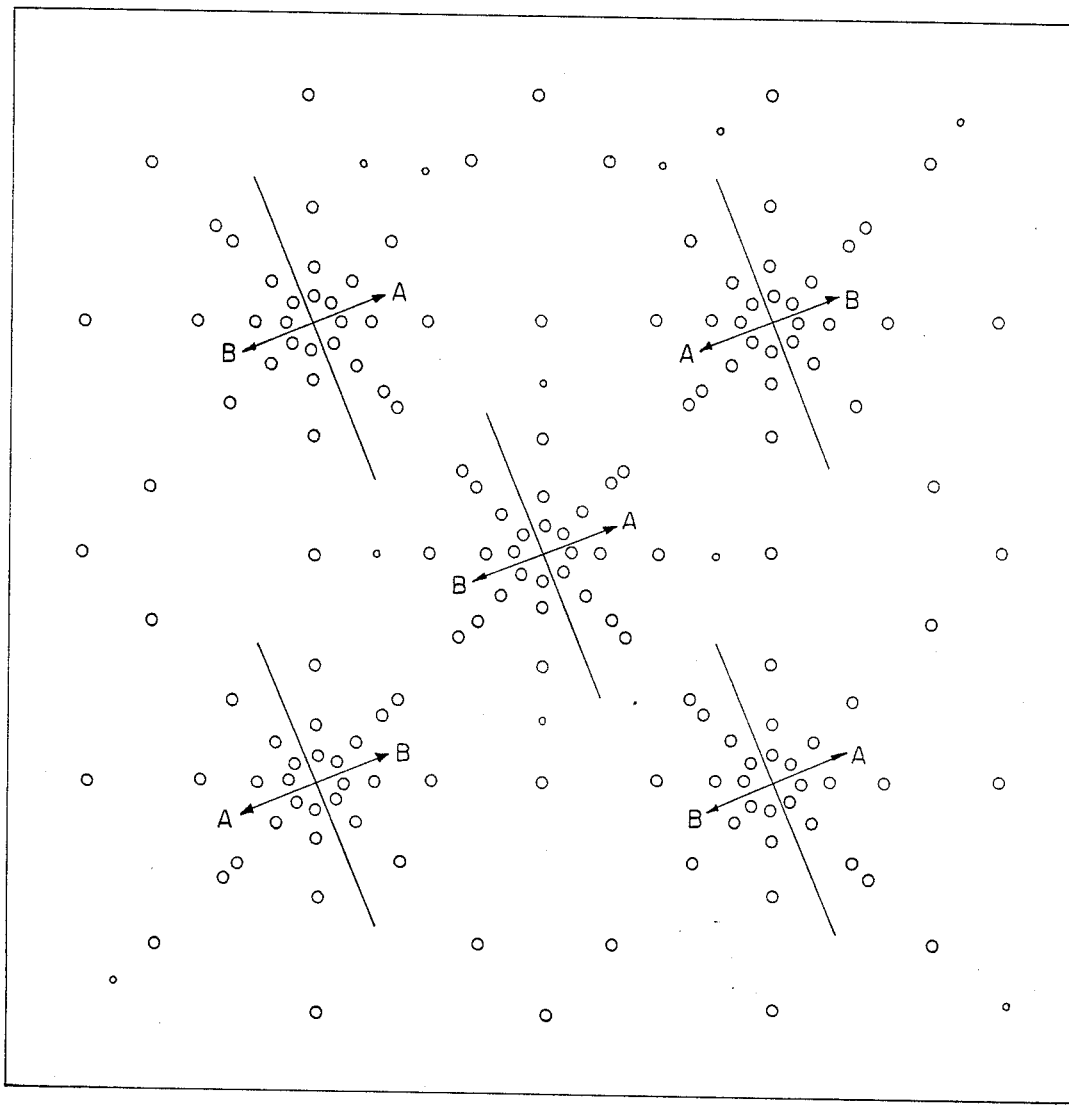
Figure 3C:
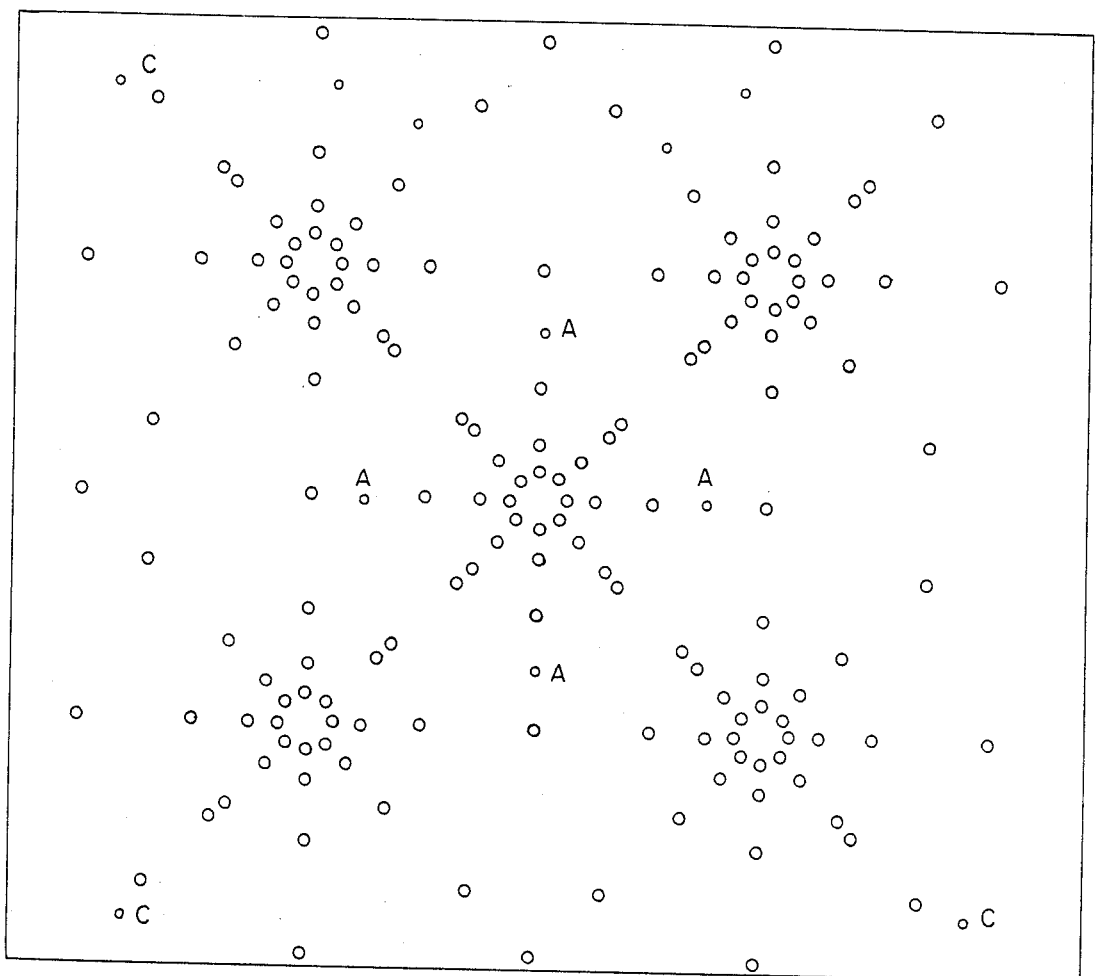

The nine switches are mechanically identical with the exception of the travel distance permitted by an internal stop and the stiffness of the spring which determines the force requirement. The body of the switch is a brass cylinder and the plunger is nylon. No electrical contact is made between the client's finger and the capacitive switch circuit until the aluminum target contacts the switch body. All target sizes fit all switches and a set screw in the target mates with a notch in the top of the switch plunger to prevent target rotation. Typical assembly drawings for the lower boards are shown in FIGS. 3A, 3B and 3C and for the upper boards in FIGS. 3D and 3E.

Figure 4:
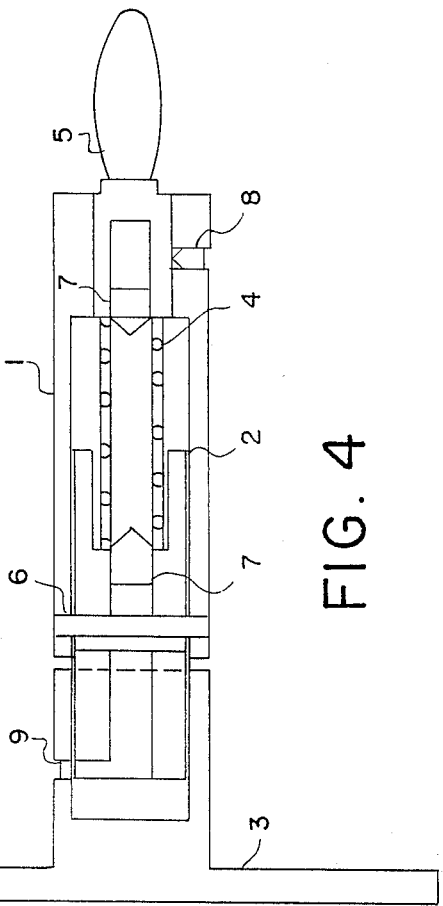
FIG. 4 is a schematic of the finite force and travel switches used in type 1 Assessment.
Figure 5:
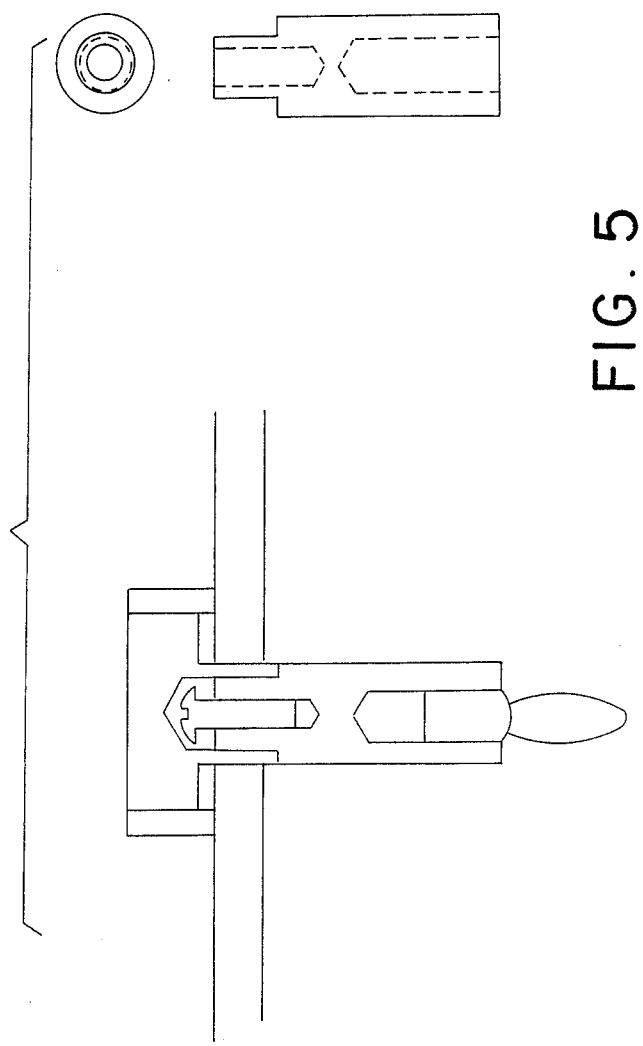
FIG. 5 is a schematic of the fixed switches used in type 1 Assessment.

The switches (with finite force and travel) are schematically shown in FIG. 4 and the fixed switches are shown in FIG. 5.

MODELING OF TYPE 1 ASSESSMENT RESULTS

The movement times recorded during the Type 1 assessment are separated into eight subsets, one for each value of $\theta$. A model of the dependence of movement time, T, on the task variables A, W, F, and Z is derived (Box 12 of FIG. 1) by means of a linear regression program which is part of the Guide software. When the full 100-task protocol is used, $100 \times 20/8 = 250$ data points are included in the regression for each value of $\theta$. The form of the model is—

$$T = a + bA + c[1/W] + dF + eZ + fFA + gZA + hF/W + iZ/W$$
$$= [a + dF + eZ] + [b + fF + gZ]A + [c + h F + iZ][1/W] \tag{5}$$

It may be seen that this model allows for dependence of T on each of the task variables as well as on four of the products of those variables. Here and in the discussion that follows 1/W is treated as if it, rather than W, was a task variable. Use of 1/W in the model is justified in three ways. First, it is consistent with the way in which W appears in Fitts' Law. Second, it makes the treatment of W consistent with the other variables in the sense that a positive coefficient is expected; as 1/W increases, the target is getting smaller and successful target acquisition can be expected to require more time. Third, as shown in the Type 1 Pilot Data section below, the data from Type 1 assessment experiments in which F and Z were zero was generally modeled with the highest values of R (correlation coefficient) when $$T = a + bA + c/W \tag{6}$$

was used as the form of the model.

The second grouping of terms in the equation above is shown to suggest a rationale for the model. The time between switch closures (which has been referred to somewhat imprecisely up to this point as "movement" time) has both a movement component and an irreducible minimum value required for releasing and closing the target switches. The former may be expected to depend on A and 1/W based on common sense, the literature of Fitts and his successors in modeling able-bodied reciprocal tapping performance (Fitts, 1954; Buck, 1980; Jagacinski et al, 1980), and our own data with the zero-force-and-travel tasks. The closure and release time can reasonably be expected to depend on the two parameters associated with the switches, F and Z. The generality of the model is enhanced by allowing the sensitivity of the dependence of T on A and 1/W (i.e. the partial derivatives of T with respect to A and 1/W) to depend on F and Z. In other words, F and Z are treated as parameters of the model while A and 1/W are the independent variables. The appropriateness of this choice is also supported by the observation that F and Z are typically constant for all keys on a nonvocal communication device while A and 1/W vary from movement to movement, determining the differences among movement times.

CALCULATION OF MDM RATE FOR TYPE 1 DEVICES

The first step in calculating Type 1 MDM Rate for a candidate device is the derivation of a keystroke history for the production of a standard text corpus using the candidate device. The file represents the sequence of movements which are necessary to compose the standard text using the device under consideration. It reflects both the language menu offered by the device and the layout of the keyboard through which the menu is accessed. The text sample used in calculating the MDM rates in this report is composed of 1454 words from three nonvocal sources (excerpts from personal and communications and published materials). This sample was chosen to be sufficiently large to be representative of nonvocal text, while allowing program execution times which are not unreasonably long. Key stroke history files have been created for each of the devices included in the Prescription Guide. This process was part of the development process and will be an essential component of continuing updating of the Guide.

Figure 6:
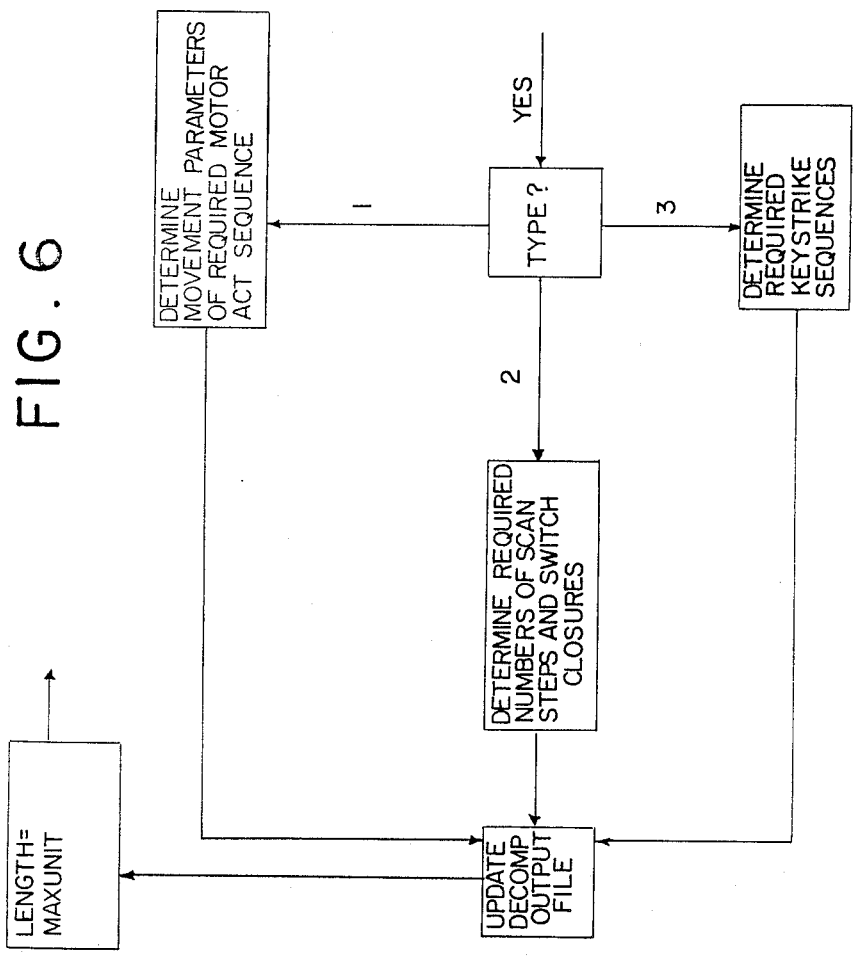
FIG. 6 is a simplified flow diagram of the decomposition procedure employed in applicants' method to calculate MDM rates for type 1 devices.

Creation of the movement history file is accomplished by a program called DECOMP, which decomposes the sample text into a sequence of units from the device's language menu, locates the keys (or sequences of keys) which must be struck to select these units on the device's keyboard, and outputs the movement amplitude and direction for each motion to a keystroke history file. The decomposition scheme is based on the principle of "left-to-right longest match", based on observations of actual users of portable language boards SPEEC and WRITE communication systems which use letter sequences (Goodenough-Trepagnier et al., 1982). The first step is to determine the length of the longest unit available in the language menu. Beginning with the next character in the undecomposed portion of the text, DECOMP takes a sample of the text of this maximum unit size and checks it for a match to something in the menu. If a match is not found, the length of the sample is decreased by 1 (by dropping the rightmost character) and the check for a match of a menu unit is repeated. This process is continued until a match is found; it identifies the longest sequence of characters on the left end of the remaining text which is available as a single menu item. The process is repeated, always starting with the first character of the undecomposed text, continuing until the end of the text corpus is reached. FIG. 6 is a simplified flowchart of the decomposition procedure (DECOMP).

The next step is conversion of the unit history into a movement history. For a direct selection device, this requires locating each language unit in the unit history on the device's keyboard. This is accomplished by finding the unit's coordinates in a lookup table which is part of the device's DECOMP input file. Using the coordinates of each unit and those of the one preceding it in the history, DECOMP calculates the inter-key distance and movement direction. If the device is encoded, i.e. requires a sequence of key strikes for each unit; or if it offers "levels", i.e. offers two or more overlayed pages of menu items accessible through a single array of keys, the table associates a sequence of coordinates with each unit.

Calculation of MDM Rate by the Prescription Guide software is the task of a subroutine (Box 13 of FIG. 1) called RATE 1 which takes as its inputs the model of the client's motion derived from Type 1 motor assessment and the movement history file for the device under consideration. For each movement in the keystroke history, the client/control mode's model allows calculation of the time required for the movement. For each movement, the set of model coefficients associated with the value of 0 closest to the 0 value for that movement is used. Values for W, F, and Z are included in the header of the movement history file, having been passed through DECOMPI from the original device file. The predicted production time for the entire standard text is calculated by summing the movement times for all the movements in the movement history file. MDM Rate is then calculated by simply dividing the number of words in the text corpus (1454) y the calculated production time.

TYPE 2 ASSESSMENT: DESCRIPTION AND RATIONALE

Type 2 assessment (Boxes 19 and 20 of FIG. 1) measures the timing of the client's use of a single switch in order to set a maximum for the scan rate and values for other adjustable parameters of scanning communicators in order that MDM Rate can be calculated for them. As for Type 1 assessment, this assessment is conducted with special purpose instrumentation, not with actual scanning devices. The following aspect of scanner use dictated the features of Type 2 assessment:

- In order to use a scanner, the user must be able to react to the arrival of the cursor at the desired location by closing the switch within the scan interval (reciprocal of scanning rate).
- Observation of the cursor and knowledge of the location of the desired selection in the scanned array provide preview of the cursor's arrival there. It is reasonable to expect this preview to reduce reaction time for some users.
- If the scanner waits for the switch to open before beginning its scan of the next scan dimension, the user's "dwell time" before releasing the switch contributes a term to the calculation of the time required per selection.
- If the device does not wait for switch release, the user must be able to release the switch and close it again within the first interval in the new scan direction on those occasions when the first item in that direction is desired.

With these features of scanner use in mind, the Type 2 assessment was designed to include the timing measurements necessary to determine MDM Rate for any device.

The assessment presents the client with a horizontal row of eight squares on the monitor screen of the computer. The fourth square is filled in to define it as the target. At the start of each assessment task, a cursor in the form of a cross hairs advances stepwise, beginning under the left-most square, stopping below each square for the set scan interval. In part A of the protocol, the subject is instructed to "close and release the switch, as quickly as possible, when the cursor matches the target". Successful performance of the task requires switch closure within the scan interval, i.e. before the cursor advances beyond the target. The cursor stops advancing once the switch is closed. In part B of the protocol, the subject is instructed that he/she must strike the switch twice during the interval when the cursor is aligned with the target. The time between the second closure and release is neither measured nor constrained.

The performance variables are defined as follows.

$T_{rpa}$ = response time with preview, measured between arrival of the cursor at the target and client's switch closure, in part A.

$T_{dw}$ = dwell time between closure and release in part A.

$T_{rpb}$ = response time with preview in part B.

$T_{cc}$ = closure to closure tme in part B.

The first two of these variables are relevant to MDM Rate calculation when the device does wait for switch release before beginning the next scan dimension, while $T_{rpa}$, $T_{rpb}$, and $T_{cc}$ apply to devices that don't wait. Earlier versions of this assessment included a third part in which the subject was required simply to close the switch as quickly as possible without requiring rapid release. This component was eliminated because analysis of pilot data could demonstrate no significant difference between the measured response times and $T_{rpa}$ values from the strike-and-release test.

Each part of the Type 2 protocol consists of sets of six repetitions of the task defined above, each set presented at a fixed value of the scan interval. A set is preceded by as many practice trials as the clinician chooses during which data is not recorded. In each set, the interval is shortened (the scan rate is increased) relative to the one before it if the client successfully performs at least five out of the six trials in a set without error. The sequence of values of the scanning interval for part A begins with 2.0 seconds and reduces this value by 0.3 sec after each set until one of two conditions occurs: If the set at 1.1 sec is performed successfully, subsequent decrements of the interval are 0.2 sec. Alternatively, if the client fails to halt the cursor within the target interval twice in a set, the set is terminated. Following the first such "failed set", the scanning interval for the next set is lengthened by 0.3 sec to the previous value (at which the client succeeded in performing correctly on at least five of six trials). If more than one error occurs in this or subsequent sets, part A of the protocol is considered complete and is halted. If the client once again succeeds in at least five repetitions, the scan interval is shortened for subsequent sets by 0.2 sec until a second failed set occurs. After a failed set has occurred, decrements are reduced to 0.1 sec when the scan interval is less than 1.0 sec. Provision for overriding in the standard criterion for halting a set is included in the Guide software primarily to allow repetition of a task if the clinician observes that the client's attention has been diverted or the task has otherwise been interrupted. The criteria for changing the scan interval and halting the assessment are the same for part B of the Type 2 protocol except that the initial interval value is 3.0 seconds to allow more time for the second closure and the decrement begins at 0.4 sec, 3.0 seconds to allow more time for the second closure and the decrement begins at 0.4 sec, decreasing to 0.3 when the interval value falls below 2.2 sec or after a failed set, or to 0.2 when both have happened.

The rationale for accelerating the scan rate from set to set derives from observations made in pilot testing of the protocol and from the necessity for providing clients with practice. As detailed below, it was found that subjects' response time tended to decrease dramatically as scan interval was decreased; the extent to which preview allowed anticipation and decreased response time increased as the scan cadence was increased (up to a certain value). On the other hand, the assessment protocol cannot "know" in advance how short the client's response time will be and must, therefore, begin at a value long enough to accommodate the slowest expected performance. In addition, it is a reasonable assumption that the client's performance will improve with practice. Familiarization with the task can be achieved at slower, gradually increasing rates (at which the client is likely to be successful), while the protocol converges on the value at which the client's fastest performance will occur.

In pilot testing of the Type 2 protocol with disabled subjects, considerably less time was required to complete the assessment than what is needed for the Type 1 protocol. Subjects to whom an earlier version which is 50% longer was administered typically completed it in one sitting lasting no more then 1 ½ hours, so that approximately an hour is anticipated for the present assessment.

Figure 7:
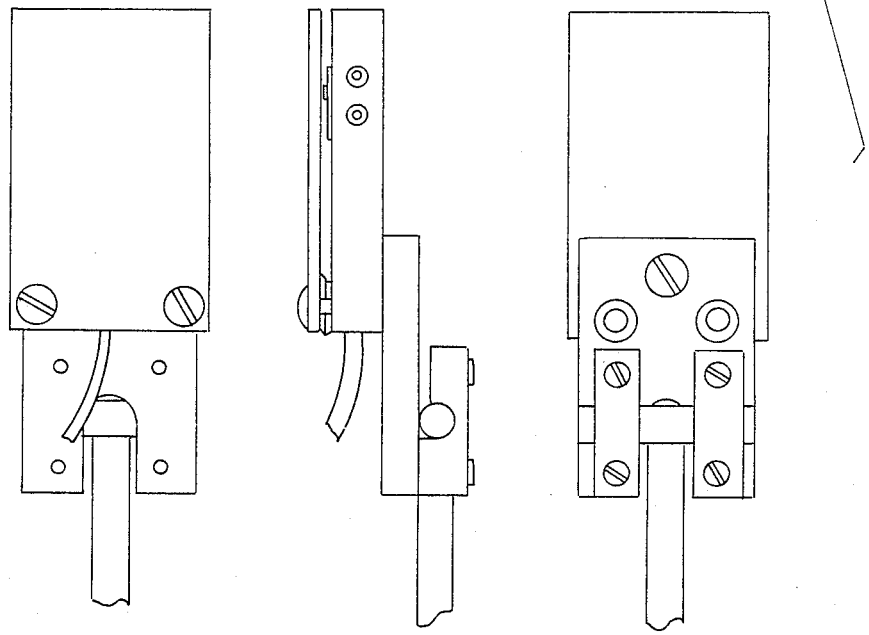
FIG. 7 is a schematic of a simple paddle switch used for type II and III Assessment.

The Prescription Guide specifies a simple paddle switch designed for ease of use and mounting by George Dalrymple. Closure requires 0.02 in travel and 2-3 oz actuation force. It is based on a commercial microswitch mounted in a plastic housing. An ⅛ in polycarbonate or acrylic treadle on flexible rubber mounts allows depression of the switch by application of force anywhere on a 2×3 in area. A degree of adjustability of force requirement may be obtained according to the distance from the treadle mounting points a which force is applied. This switch also provides two degrees of freedom of orientation with respect to the support rod on which it is mounted, in addition to rotation of the rod about its own axis. FIG. 7 is a schematic of a simple "Dalrymple" paddle switch. While pilot tests of the Type 2 assessment were performed with the Dalrymple switch, several commercially available switches are equally suitable. These include:
 - Lever Switch model CM-9B, Zygo Industries, P. O. Box 1008, Portland, Oreg.;
 - Square Pad Switch model 5810, TASH Inc. 70 Gibson Drive, Markham. Ont; or
 - Leaf Switch model 5860, also from TASH.

It should be noted that neither the protocol nor the computer interface restricts the performance of the Type 2 assessment to use of mechanical switches. Any instrumentation which produces switch closure can be used.

The inclusion in the Prescription Guide software of provision for unlimited numbers of practice trials allows the clinician to familiarize the client with the Type 2 task with even the most unconventional control mode.

TYPE 2 MODELING AND MDM RATE CALCULATION

The "model" of the client's Type 2 performance derived by the Guide software (Box 21 of FIG. 1) requires only the simplest processing of the recorded values of $T_{rpa}$, $T_{dw}$, $T_{rpb}$, and $T_{cc}$. For the two response times, $T_{rpa}$ and $T_{rpb}$, and the closure-to-closure time $T_{cc}$, the client's performance is represented by the maximum value of each of these variables measured during the successful set of trials conducted at the shortest scan interval. The rationale for this choice is as follows. The goal of the assessment is to find out how fast a scanning nonvocal communication device can be run, given the client's switch operation abilities. The successful trials at the shortest scan interval yield, by definition, measured performance time values at the fastest scan rate at which the client was able to stop the cursor reliably at the desired location. Data collected in that set also represent the most practiced successful performance observed in each part of the assessment. The maximum value of each of the variables measured in the 5 or 6 successful repetitions is used because this value approximates the maximum value that would be observed over a more extended set of trials. Depending on the particulars of the scanner, it is the maximum of one of these three variables that sets a lower limit on the scan interval at which it can be used by the client.

In contrast, dwell time, $T_{cc}$, is represented by the average of the values measured in the successful trials. This distinction is due to the fact that $T_{dw}$ influences MDM Rate by contributing an additional component to the time required for selection of a language unit (for devices which wait for the switch to be released before resuming the scan), not by setting a lower limit on scan rate. Hence, its average value rather than its maximum that determines its effect on MDM Rate.

It must be recalled that, as for Type 1, the purpose of MDM Rate calculation for Type 2 devices is to establish the upper limit on rate determined by the client's motor abilities. For this reason it is calculated at a value of scan interval (and other parameters as noted below) which allows no "breathing room" above the minimum allowed by the client's reaction time. It is not anticipated that a client could actually use a scanner comfortably for extended periods of time at that rate even when thoroughly familiar with its menu. As a basis of comparison with MDM Rates derived for Type 1 devices, however, it is precisely this upper limit on rate for scanners that we desire.

The process of calculating MDM Rate for a Type 2 device begins with the use of DECOMP2 to prepare an input file for RATE2. The latter runs as part of the Guide software at the time of prescription while DECOMP2 has been run as part of the development of the system. DECOMP2 operates on the same standard text file as DECOMP1 The input file for each device includes the following information in its "header":
- the number of dimensions, D, of the device's scan pattern, e.g. 1 for linear, 2 for row-column, and 3 for page-row-column;
- a 1 or a 0 indicating whether the device does or does not wait for release of the switch before continuing the scan, respectively;
- a "flag" indicating that the device has adjustable dimension selection delay (1), or that this delay is fixed or absent (0); dimension selection delay is defined as the amount by which the firs interval following switch closure is greater than the usual scan interval, a feature present in some devices to facilitate selection of the first item in the new scan dimension initiated by switch closure;
- a sequence of numbers signifying the values of the dimension selection delays $T_{d1}$, $T_{d2}$, $T_{d3}$ . . . for each dimension: 0 if there is none, the minimum value if it is adjustable;
- a value for the unit selection delay, $T_u$:0 if none, its minimum value if it is adjustable; this is defined as the amount by which the first interval following the selection of a unit—i.e. after the last switch closure required for indicating a desired menu element—is greater than the standard scan interval plus any dimension selection delay present; and
- the minimum value, $T_{smin}$, of the scan interval.

In addition to this information which defines what we refer to as the "rules of use" of the scanner, the body of the file lists all the units in the device's menu, associating each with the number of scanning intervals required in each dimension for the scan to reach it. Clearly, this information corresponds to the coordinates of menu items listed in Type 1 DECOMP input files. In addition, if the scanner employs levels, i.e. employs two or more overlaid scanned arrays which one selects (and in which one stays until one chooses to change levels) by scanning to a level-selection location; the level on which each unit occurs is also listed.

DECOMP2 uses this file in conjunction with the standard text to prepare a much smaller file which is used by the Guide software to calculate MDM Rate. By decomposing the text into the units provided by the menu using a left-to-right longest-match algorithm, DECOMP2 calculates the total number of steps in each dimension, $N_1$, $N_2$, etc. required to communicate that text. The resultant file contains the same header as the input device file, the scan step totals, the number of words in the standard text, and C. This last quantity is the "linguistic cost" of composing the average word in the standard text, measured in units per word. It is calculated by totalling the number of units which were needed to compose the text and dividing by the number of words.

RATE2 uses the values of the four response times defined above to compute MDM Rate (Box 26 of FIG. 1) for each scanning device for which the Guide software includes a DECOMP2 output file. The general formula for the time required to compose the standard text using a scanner may be derived as follows. We define:
$T_s$ = scanning interval (sec);
$T_j$ = extra time associated with beginning scan dimension j;
$T_u$ = extra time associated with the selection of a unit; and
$N_w$ = the number of words in the standard text.

In terms of these variables and parameters defined above, the total time required for composition of the standard text for a row-column scanner is:

$$T_t = (N_1 + N_2)(T_s) + [N_w \times C \times (T_u + T_1 + T_2)] \tag{7}$$

where the first major term is access time dictated by the number of scan intervals and the interval time, while the second major term accounts for any extra time associated with dimension and unit selection.

The client's measured performance times determine the values of $T_s$ and $T_j$ in a way that depends on their relative values and on the rules of use of the device. This dependence may be expressed as follows:
- If the device waits for release of the switch before beginning the next scan dimension, $$T_s = T_{rpa}, \tag{8A}$$

$$\text{and } T_j = T_{dj} + T_{dw} \tag{8B}$$

for each dimension j (with $T_{dj} = 0$ for some devices);
- If the device does not wait for release of the switch before beginning the next dimension—

$$T_s = \max[T_{rpa}, T_{rpb}, T_{cc} - \min(T_{dj}), T_{smin}]; \tag{8C}$$

$$\text{and } T_j = T_{dj}, \text{ (where } T_{dj} \text{ may be 0).} \tag{8D}$$

The equation for $T_s$ for devices which do not wait may be understood as follows. When the cursor arrives at a desired location, the scan interval must be long enough to accommodate the user's reaction time, i.e. $T_{rpa}$ when s/he is not trying to catch the first item in the new dimension, $T_{rpb}$ when s/he is. In addition, if the user wishes to select the first unit in the new scan dimension, then the scan interval plus any dimension selection delay the device provides must be sufficient for the user's closure-to-closure time. $T_s$, then, is dictated by the longer of the two requirements (unless the shortest available value, $T_{smin}$, is larger than any of these). The shortest of the dimension selection delays is used (if their values are different or different dimensions) since in that case the scan interval must provide the greatest proportion of the closure-to-closure time.

Once $T_t$ is calculated, MDM Rate is simply $N_w/T_t$.

TYPE 3 ASSESSMENT: DESCRIPTION AND RATIONALE

Type 3 assessment (Box 24 of FIG. 1) measures the time required for the client to alternate closure of pairs of switches mounted for actuation by separate body parts. It is designed to provide data from which MDM Rate may be calculated for encoded devices which are controlled by means of switches distributed over the client's available control sites. As for Type 2 assessment, there is no limitation as to the type of switches. While this mode of controlling a device is not as common as planar keyboards and single switches, it can have the advantage for some clients who are not capable of using a type 1 device of making better use of available voluntary control than scanners, thereby providing higher communication rate. The assessment is based on the observation that the motoric limit on use of a distributed-switch device is set by the time required between successive switch closures. As in Type 1 assessment, the client is asked to perform a simple alternation between two switches in each task in order to obtain a reliable estimate of his/her mean closure-to-closure time. See FIG. 2.10 for a photograph of an able bodied subject set up with four switches, and the kit of fixtures used to mount switches for testing. A single task consist of ten closures of each switch with the instruction to complete the task as quickly as possible.

The computer interface limits the number of switches in this assessment to 8. The maximum number of tasks allowed for in the protocol is 64, i.e. all possible switch "pairs" including each with itself. The sequence is randomized and practice is allowed to familiarize the client with each new combination. For a client whose average closure-to-closure time is one second, a single task requires twenty seconds. If we allow the remainder of a minute for rest and practice, a full eight switch protocol requires roughly one hour (exclusive of the time required for choice of control sites and switch mounting).

TYPE 3 MODELING AND MDM RATE CALCULATION

The numbers which are generated at the end of a Type 3 assessment for use by the MDM Rate prediction software are simply the average values of the closure-to-closure times for all pairs of switches. This "model" is simply a lookup table; there is no attempt to analyze or fit it with a closed form mathematical expression for the simple reason that no task variables suggest themselves for regression, nor do physiology, biomechanics, or the "psychology or movement" offer any analytical basis for modelling. Because this approach to device control depends on discrete acts at a finite number of sites, use of a lookup table of performance times entails no loss of generality or need for interpolation.

MDM Rate calculation is performed by RATE3 (Box 26 of FIG. 1). This program operates on two files: the output file from DECOMP3, and the Type 3 assessment results table. DECOMP3, which was run for each Type 3 device during development of the Guide (and will be for new devices of that type to update the system), generates a table which represents the frequency with which switch closure at each input jack is followed by closure at all others. As for Type 1 and Type 2, the decomposition of the Standard Text File is used as the basis of this "jack-pair" frequency table. This terminology id used to distinguish between the switches which are associated with body parts and actions in assessment of the client, and input jacks on the device to which switches will be connected. RATE3 calculates average time per switch closure by multiplying the time required for each switch-pair by the frequency of the jack-pair to which it is connected and summing these products. MDM Rate is calculated from average time per switch by multiplying it by the average number of switch closures per word, also derived by DECOMP3.

Since neither DECOMP3 nor the assessment of the client in any way constrain the connection of the body-distributed switches to the input jacks of a device, RATE3 has an additional feature; it performs the calculation of MDM Rate repeatedly in order to determine the mapping from switches to jacks which provides the highest value. If the number of switches (and jacks) is six or less, this optimization is done exhaustively, i.e. MDM Rate is calculated with all 6! permutations of the switches and jacks. Execution time for this calculation is only five minutes. In order to deal with the impractically long time required for seven or eight switches, an additional step is included. The jack-pair frequency table is used to identify the six jacks at which switch closures most frequently occur, and the client's switch-pair time table is used to close the six switches which require the least time to close in combination with all others. Exhaustive optimization of the mapping of these two sets of six is performed with each of the two possible assignments of the remaining two jacks to switches (if the number of each is eight).

THE MOTOR SURVEY

The Motor Survey as shown in the flow chart of FIG. 1 (Box 7), has two purposes. The first is to identify the "control modes" which are reasonable candidates for motor assessment for a given client. The second, which applies only to Type 1 assessment, is to measure certain motoric "critical abilities" for each control mode in order to rule out this assessment if necessary; to customize the assessment protocol for the client; and to eliminate as candidates for prescription any Type 1 devices whose operational requirements exceed these abilities.

A control mode is defined as a combination of:
- client position, e.g. seated, reclining supine, or semi-reclining with the client's body at 45 degrees from the vertical;
- body part or parts to be used for closing switches, e.g. right hand, left knee, headstick, or right foot;
- body part action, e.g. wrist extension, knee flexion, foot plantar flexion, eyebrow elevation, positive pressure on a breath switch, or biceps myoelectric activity;
- type of switch or switches used in the case of Types 2 and 3 assessment; and
- assistive hardware such as slings, splints, mobile arm supports, wheelchair arm rests, and seating inserts.

In the case of assessment Types 1 and 2, a control mode specifies a single body part as the end effector which will be used to move from target to target or close the switch which halts scanning. For Type 3, the control mode includes specification of from 2 to 8 body parts and actions with which switches will be actuate. It is important to note that for motor assessment Types 1 and 2, the Guide prompts the clinician to define and assess as many control modes as he/she considers worthwhile, with eight as maximum (it also treats subsets of the Type 3 control mode when calculating MDM Rate for devices which require fewer switches than the number of sites defined in the control mode). Because different control modes may have different apparent strengths and weaknesses, e.g. speed vs. accuracy vs. strength vs. fatigue resistance vs. range of motion, it will generally be impossible for the clinician to establish by observation that one will be superior for all devices of a certain Type. A primary function of the Prescription Guide is to calculate MDM Rate as an objective means for comparing the various possible control mode/device combinations. Rejection of a feasible control mode without assessment is appropriate, therefore, only when it is clearly inferior with respect to motor abilities or when exclusion is dictated by other important considerations such as client preference, other therapeutic goals, cosmetic appeal, or availability of required augmentative equipment.

The Guide does not require that the clinician justify the control mode choices that he/she makes, only that a concise description be composed which will be associated by the Guide software with motor data files obtained with each control mode. The validity of the MDM Rate value calculated for a device/control mode combination will be determined in part by the accuracy with which the features of the control mode in which assessment was conducted are reproduced when the client is set up with the selected device. In the case of upper extremity use of a keyboard device, for example, if Type 1 assessment was completed under particular conditions of elboW support, the MDM Rate which was used to justify the selection of that device will have predictive value only if the same support is provided during device use. The point is that the clinician must consider the same factors in defining reasonable control modes prior to assessment that he/she would when setting the client up for use of particular class of device. It is at that point in the use of the Prescription Guide that clinician expertise has a strong influence on the quality of the prescription.

As noted at the beginning of this description, the second purpose of the Motor Survey is to measure motor critical abilities prior to Type 1 assessment. For each control mode defined by the clinician, three sets of measurements are made using the Type 1 test panel:

- Reach envelope. When the clinician sets up the client and the test panel in a control mode, he/she is prompted by the Guide to center one of the target patterns on the range of motion of the end effector being used. During the motor survey prior to Type 1 assessment, the clinician measures the greatest distance the client can reach in each of the eight directions defined by the test panel. The clinician makes these measurements using a tape measure, and enters the eight values via the computer keyboard. If the centering of the board was performed carefully, there should be no systematic assymetry of the reach envelope defined in this way. Measurements are entered accurate to the nearest half inch and values are allowed which fall between the positions of available target holes. These entries are used to establish a maximum value of target-to-target distance $A_{max}(0)$ for each direction (using max the smaller of the two measured values for reciprocal directions to set the limit for both).
- Actuation force. The client is asked to depress Type 1 target switches positioned at the most distant hole from the center of the target pattern he/she can reach in each direction. The clinician establishes the largest value of force, $F_{max}$, from zero to 8 ounces, he/she can reliably exert at each of those locations by repeating the task, if necessary, with each of the switches. The limit on the client's force exertion ability is also measured at a location near the center of the pattern, i.e. one of the $A=1.5$ locations. The nine measured values are entered at the keyboard as requested by the Guide.
- Accuracy. The purpose of this measurement is to determine the smallest of the Type 1 targets the client can acquire reliably at the completion of target-to-target movement. To make this measurement, the clinician sets up one pair of targets at a time as for the Type 1 assessment. The zero-force targets are placed reciprocally using the smallest of the eight target-to-target distances measured in the reach envelope determination. The client is asked to touch these targets alternately being careful not to miss. By trying different values of target diameter, $W$, the clinician establishes the smallest size, $W_{min}$, the client can strike with no more than one miss in ten tries. The instruction to the client emphasizes accuracy with no mention of speed of alternation. This test is repeated at each pair of reciprocal directions and the results keyed into the computer as prompted. If the client can reliably hit a point target, the clinician is instructed by the Guide to enter 0. One other measurement is made which influences accuracy, i.e. the width, D, of the end effector. If the end effector widens appreciably when applying actuation force, its width is measured when closing the 8 oz switch. If the contact area of the end effector on a hard surface is not round, the largest width is measure. The relevance of D may be seen as follows. We define the error circle here as the circle within which the client can place the center of his end effector 90% of the time. If the diameter of the error circle is defined as $W^*_{min}$, then the client can reliably strike targets as small as $W^*_{min} - D$, i.e. $W_{min} = W^*_{min} - D$.

The results of these measurements are used in the three ways summarized at the start of this section:

- Test for exclusion of Type 1 assessment for the control mode under consideration. In order to formulate a valid model of Type 1 assessment results, combinations of at least two values of A with at least two values of W must be within the abilities of the client in the control mode under consideration. Since only a finite set of values of movement amplitude is available the Guide software can define a protocol only if $A_{max} \geq =3$ so that $A=1.5$ and $A=3$ may be included in the protocol. If $A=3$ is the limit, $W_{min}$ must be greater than 0.75 in order for two sizes to be available (since $W=1$ is the largest target size that can be accommodated in 3 in movements). If $A_{max} \geq =6$, any pair of values of W can be the basis of an assessment protocol, so that $W_{min}$ can be as large as 2 inches (since this would allow values of W of 2 and 2.5). The value determined for $F_{max}$ does not influence exclusion of Type assessment since there are numerous keyboard devices available which require virtually no actuation force; a Type 1 model of the client is useful even when $F_{max}=0$.
- Formulation of the Type 1 assessment protocol (Box 10 of FIG. 1). The central composite design used to span the possible combinations of values of the task variables requires that two extreme values and, where possible, an intermediate value be specified for each variable. The Guide software automatically designs a protocol using the values of $A_{max}(0)$, $F_{max}$, and $W_{min}$ derived from the data entered during the Motor Survey.

- Type 1 device exclusion. By comparison of $A_{max}(0)$, $F_{max}$, $W_{min}$, and D with the operational requirements of keyboard devices, the Guide software establishes which devices should be excluded from consideration for the control mode under consideration. The details of that comparison (Box 8 of FIG. 1) are as follows. We define the operational requirements of device j as—

$A_{reqj}(0) \equiv$ distance in inches from the center of the keyboard that the user must move in order to strike the most distant key for each of the eight values of 0. (The center is defined as the intersection of the diagonals for a rectangular interface and more generally as the approximate centroid for more irregular shapes. For definition of 0 values with respect to the keyboard, the device is assumed to be oriented as was the test panel.)

$F_{reqj} \equiv$ the force which the user must be able to produce in order to actuate the keys of the device.

$W^*_{reqj}$ = the allowable error circle within which the center of the end effector must be able to touch reliably in order to make desired selections and avoid striking adjacent keys. If the center-to-center distance of the keys of deviCe j is defined as $S_1$, and key width is defined as $W_1$, then it can be shown that $$W^*_{reqj} = \min\{W_j + D, 2S_j - (W_j + D)\}. \quad (10)$$

In order for device j to be usable by the client, all of the following conditions must be met:

$A(0) \geq = A_{reqj}(0)$ for all eight values of 0;

$F \geq = F_{reqj}$, and $W_{min} + D = W^*_{min} \leq = W^*_{reqj}.$

Attached hereto and incorporated into the specifications by reference are the following appendices covering the software used in the performance of applicants' claimed method:

Appendix 1 Prescription Guide Software Listing
Appendix 2 NEWPLITE Command Macro with Comments
Appendix 3 NEW AUTO Command Macro with Comments
Appendix 4 LEFT Spreadsheet as it Appears on the Screen
Appendix 5 LEFT Formulas for Needs
Appendix 6 LEFT Formulas for Weights
Appendix 7 Glossary of Cell Names for LEFT
Appendix 8 Category Weight Section of LEFT as it Appears
Appendix 9 Functional Category Weights Formulas from LEFT
Appendix 10 Range Name Table from NEWPLITE
Appendix 11 RIGHT Spreadsheet as it Appears
Appendix 12 Explanation of Needs Met Formulas from RIGHT
Appendix 13 Needs Met Formulas for RIGHT
Appendix 14 Specifications Met Formulas for RIGHT
Appendix 15 Device Features File, DEVICES.WK1, for all Completed Devices, Including Explanatory Comments
Appendix 16 Needs Met Profiles for Devices in Appendix 15
Appendix 17 CENTER Spreadsheet as it Appears
Appendix 18 CENTER Category Formulas

TABLE 1

NEEDS QUESTIONNAIRE:

1 BASIC INFORMATION
1  Is this an evaluation for
   A. a primary communication aid?
   (augmentative or alternative to speech)
   B. a writing aid only?
   (alternative to writing and/or typing)
   C. as back-up communitcation aid?
   (primary aid already selected)
2  Age:
   A. pre-puberty.  B. puberty to 45.  C. >45.
3  Gender:
   A. male.  B. female.
4  Cognition and language:
   A. both are within normal limits.
   B. either or both not WNL.
5  Perception:
   A. no central perceptual involvement.
   B. some central perceptual involvement.
6  The client's hearing:
   A. normal  B. mild deficit  C. severe deficit or deaf
7  The client's vision:
   A. normal  B. mild deficit  C. severe deficit or blind
8  Prognosis:
   A. Client's condition is very likely to deteriorate.
   B. Client's condition is unlikely to deteriorate.
   C. Don't know.

2 SPEECH
9  Which of the following most aptly describes the client's residual speech?
   A. no intelligible speech; the client is functionally non-speaking.
   B. a small repertoire of distinguishable words and/or phrases.
   C. some usable speech.
10 Client's isolated word intelligibility:
   A. >75%  B. >50%  C. >25%  D. <25%
11 Which of the following is most applicable to the client's interaction with primary care-providers?
   A. client's speech used in most exchanges.
   B. client's speech used in some exchanges.
   C. client's speech used in none of the exchanges.
12 Which of the following is most applicable to the client's interaction with people closest, most important to client?
   A. client's speech used in most exchanges.
   B. client's speech used in some exchanges.
   C. client's speech used in none of the exchanges.
13 Which of the following is most applicable to the client's interaction with other friends?
   A. client's speech used in most exchanges.
   B. client's speech used in some exchanges.
   C. client's speech used in none of the exchanges.
14 Which of the following is most applicable to the client's interaction with other people?
   A. client's speech used in most exchanges.
   B. client's speech used in some exchanges.
   C. client's speech used in none of the exchanges.
   Rate the client's speech intelligibility to each of the following four categories of people:
15 primary caregivers.
   A. >75%  B. >50%  C. >25%  D. <25%
16 most important people
   A. >75%  B. >50%  C. >25%  D. <25%
17 other familiar people.
   A. >75%  B. >50%  C. >25%  D. <25%
18 unfamiliar people.
   A. >75%  B. >50%  C. >25%  D. <25%

3 POSITION & MOBILITY
19 Indicate whether the following hold for this client:
   A. spends >90% of time in same setting.

TABLE 1-continued
NEEDS QUESTIONNAIRE:

B. changes setting.
    Client's position during waking hours:
20  standing:
    A. most of day  B. some of time  C. rarely or never.
21  sitting at about 90 degrees:
    A. most of day  B. some of time  C. rarely or never.
22  sitting at 91–110 degrees:
    A. most of day  B. some of time  C. rarely or never.
23  reclining at 111–140 degrees:
    A. most of day  B. some of time  C. rarely or never.
24  reclining at 141–180 degrees:
    A. most of day  B. some of time  C. rarely or never.
25  lying prone:
    A. most of day  B. some of time  C. rarely or never.
26  lying supine:
    A. most of day  B. some of time  C. rarely or never.
27  side-lying:
    A. most of day  B. some of time  C. rarely or never.
28  During waking hours, is client in bed:
    A. <1 hour/day  B. 2–5 hours/day  C. >5 hours/day.
29  Client's position during sleep:
    A. prone      B. 110–140  C. 140–170
    D. supine    E. on side   F. position unrestricted.
30  Does client walk?
    A. always               B. usually ambulatory
    C. sometimes ambulatory    D. rarely ambulatory
    E. not ambulatory
31  Is there a need for human support or is a walking aid used?
    A. cane          B. walker      C. other aid
    D. aid plus human  E. human only  F. ambulates
       support                                      indpndtly
32  Wheelchair use:
    A. uses electric wheelchair      B. wheelchair - own power
    C. whlchr - own & others' power  D. whlchr - other' power
    E. little or no wheelchair use   F. electric and own power
    Transportation in vehicle:
33  Frequency:     A. ≧5 days/wk    B. 2–4 days/wk
    C. 1 day/wk     D. <1 day/wk,    E. rare
                            >1 day/month
34  Mode:   A. in wheelchair      B. litter
             C. out of wheelchair.
35  Client uses public or special needs transportation
    independently:
    A. ≧1 day/wk  B. occasionally  C. never.

4 DEVICE OPERATION

36  If client currently operates communication device or other
    controls, indicate actuator:
    A. right hand      B. left hand
    C. both hands     D. head
    E. head and hands  F. other
37  If client currently operates communication device or other
    controls, indicate actuator:
    A. one foot       B. both feet
    C. mouth stick    D. headstick
    E. eyegaze       F. other
38  If client currently operates communication device or other
    controls, indicate actuator:
    A. joystick       B. mouse
    C. eyebrow     D. lightpen
    E. trackball     F. other
39  Client's preferred actuator:
    A. right hand      B. left hand
    C. both hands     D. head
    E. head and hands  F. other
40  Client's preferred actuator:
    A. one foot       B. both feet
    C. mouth stick    D. headstick
    E. eyegaze       F. other
41  Client's preferred actuator:
    A. joystick       B. mouse
    C. eyebrow     D. lightpen
    E. trackball     F. other
42  How may switches can client probably be expected to operate?
    A. 1 or 2-switch device only  B. >2 switches
43  Does client have a horizontal surface (table and/or laptray)
    available to him all of the time?
    A. horizontal surface always available
    B. horizontal surface not always available

5 ATTITUDES & PREFERENCES

44  Rate the client's drive to communicate:
    A. high        B. >average    C. average
    D. <average   E. low         F. very low.
45  Rate the client's willingness to use a communication device:
    A. high        B. >average    C. average
    D. <average   E. low         F. very low.
46  The client's attitude to technology (computers, devices) is
    A. positive or neutral.  B. negative.
47  Is it important for this client to have some customized
    vocabulary?
    A. extremely important  B. moderately important
    C. not a concern.
48  Client's willingness to undertake device with higher learning
    demand in order to obtain better communication rate:
    A. willing to take on more difficult device.
    B. not willing to take on more difficult device.
49  How does client feel about the use of an artificial voice?
    A. strongly in favor  B. interested       C. neutral
    D. not interested     E. very much opposed
50  Do you think the client will accept the robot-like,
    monotonous voice available in most communication aids
    having speech output?
    A. probably still be in favor    B. probably still interested
    C. probably neutral           D. probably not interested
    E. probably opposed.
51  How important does client consider auditory privacy, i.e.,
    option of not having, turning off or turning down volume
    of voice:
    A. extremely important  B. moderately important
    C. not a concern/NA.
52  How often will client have occasion to be alone and
    dependent on telephone in case of emergency?
    A. ≧5 days/wk     B. 1–2 days/wk     C. <1 day/wk
    D. ≦1 day/month  E. never.
53  Environmental control by means of communication device:
    A. will use   B. will probably use
    C. may use   D. will probably not use.
54  Utility of an autodialer:
    A. necessary  B. definitely helpful
    C. desirable  D. not useful.
55  Utility of a buzzer or call beep:
    A. necessary    B. definitely helpful
    C. desirable    D. not useful.
56  Client's interest in computer access:
    A. extrmly intrstd     B. interested
    C. neutral              D. doesn't want to use computer

6 ACTIVITIES

Interests:
57  correspondence with friends:
    A. very important  B. moderately impt  C. no
58  correspondence with public figures, newspapers:
    A. very important  B. moderately impt  C. no
59  drawing:
    A. very important  B. moderately impt  C. no
60  creative writing:
    A. very important  B. moderately impt  C. no
61  keeping journal:
    A. very important  B. moderately impt  C. no
62  How important does the client consider telephone use?
    A. extremely important  B. very interested
    C. moderately interested  D. not very interested.
63  The client is involved in educational or occupational
    activities, or has prospects or is expected to have prospects of
    educational or occupational activities:
    A. yes.  B. no plans for either activity.
64  If education is a current or future possibility:
    Will it take place: A. in classroom B. at home/residence.
    C. No educational plans.
65  Use of communication device in occupation:
    Choose the most accurate description of device use
    on the job
    A. device will be needed only for person-to-person
       communication.
    B. device will be needed for communication and production
       of written text.
    C. device will be needed for communication, text, and
       accounting.
    D. device will be used for communication, text, and
       computer use.
    E. device will be needed for communication, text, accounting,
       and computer use.

TABLE 1-continued
NEEDS QUESTIONNAIRE:

F. device will be needed on the job for none of these functions or the question is not applicable.

66  Importance of computer to educational/occupational plans:
    A. computer necessary.
    B. computer helpful.
    C. computer not needed or no educational/occupational plans.

7 ENVIRONMENT

Does the client spend significant time in settings with any of the following conditions

| # | Question | | |
|---|---|---|---|
| 67 | considerable level of background noise: | A. yes | B. no |
| 68 | high humidity: | A. yes | B. no |
| 69 | temperature may fall below 50 deg F.: | A. yes | B. no |
| 70 | temperature may fall below 32 deg F.: | A. yes | B. no |
| 71 | temperature may go above 80 degrees: | A. yes | B. no |
| 72 | temperature may reach 100 deg F.: | A. yes | B. no |
| 73 | dirty conditions: | A. yes | B. no |
| 74 | very bright lighting or sunshine: | A. yes | B. no |
| 75 | high risk of bumping, dropping device: | A. yes | B. no |
| 76 | normal risk of bumping, dropping: | A. yes | B. no |

8 PROFESSIONAL SUPPORT

Training for device user:

77  Frequency:  A. 1 session   B. 2-3 sessions
    C. >3 sessions   D. no training for user.

78  Professional providing training:  A. speech path.  B. OT
    C. teacher   D. 2 or more of above
    E. other or not applicable 79  Indicate whether the following conditions hold for this client:
    A. Custom software can be developed for client.
    B. Hardware can be customized for client.
    C. Both are possible.
    D. Neither are possible.

80  Indicate who will oversee installation of device including any adaptations needed.
    A. OT   B. engineer   C. OT and engineer
    D. other rehab professional(s)   E. not a rehab professional Rate skill of person overseeing installation:

| # | Question | | | |
|---|---|---|---|---|
| 81 | positioning: | A. exclnt | B. adeqt | C. inadqt |
| 82 | mounting: | A. exclnt | B. adeqt | C. inadqt |
| 83 | fabrication and/or adaptation: | A. exclnt | B. adqt | C. inadq |

9 PEOPLE WITH WHOM THE CLIENT INTERACTS

84  Interaction with groups:
    A. group of 2-4 people ≧1/week
    B. group of 2-4 people occasionally
    C. group of 2-4 people rarely 85  Interaction with groups:
    A. group of 5-12 people ≧1/week
    B. group of 5-12 people occasionally
    C. group of 5-12 people rarely 86  Interaction with groups:
    A. may often give presentations, speeches
    B. may occasionally give presentations, speeches
    C. unlikely ever to give presentations, speeches.

87  Interaction with unfamiliar people:
    A. very frequently   B. often   C. occasionally
    D. rarely   E. never.

How often do these people make contact with the client by phone?

| # | Question | | | |
|---|---|---|---|---|
| 88 | primary care providers: | A. often | B. smtimes | C. rare |
| 89 | most important people: | A. often | B. smtimes | C. rare |
| 90 | other friends: | A. often | B. smtimes | C. rare |
| 91 | other people: | A. often | B. smtimes | C. rare |

Estimate the ability of the following four categories of people to carry out any ongoing necessary maintenance of device:

| # | Question | | | |
|---|---|---|---|---|
| 92 | primary care-providers: | A. exclnt | B. acptbl | C. inadq |
| 93 | most important people: | A. exclnt | B. acptbl | C. inadq |

Estimate their ability to carry out setting-up of device and/or client so that client may operate the device:

| # | Question | | | |
|---|---|---|---|---|
| 94 | primary care-providers: | A. exclnt | B. acptbl | C. inadq |
| 95 | most important people: | A. exclnt | B. acptbl | C. inadq |

Do any of these people have visual limitations?

| # | Question | | |
|---|---|---|---|
| 96 | primary care-providers: | A. none | B. slight dfclt |
|  | C. signfcnt dfclty | D. much dfclty | E. blind rcvr. |
| 97 | most important people: | A. none | B. slight dfclt |
|  | C. signfcnt dfclty | D. much dfclty | E. blind rcvr. |
| 98 | other friends: | A. none | B. slight dfclt |
|  | C. signfcnt dfclty | D. much dfclty | E. blind rcvr. |
| 99 | other people: | A. none | B. slight dfclt |
|  | C. signfcnt dfclty | D. much dfclty | E. blind rcvr. |

Do any of these people have reading problems?

| # | Question | | |
|---|---|---|---|
| 100 | primary care-providers: | A. none | B. slight prblm |
|  | C. signfcnt prblms | D. severe prblms | E. non-reader. |
| 101 | most important people: | A. none | B. slight prblm |
|  | C. signfcnt prblms | D. severe prblms | E. non-reader. |
| 102 | other friends: | A. none | B. slight prblm |
|  | C. signfcnt prblms | D. severe prblms | E. non-reader. |
| 103 | other people: | A. none | B. slight prblm |
|  | C. signfcnt prblms | D. severe prblms | E. non-reader. |

Do any of these people have hearing difficulties?

| # | Question | | |
|---|---|---|---|
| 104 | primary care-providers: | A. none | B. slight prblm |
|  | C. signfcnt prblms | D. severe prblms | E. deaf rcvr. |
| 105 | most important people: | A. none | B. slight prblm |
|  | C. signfcnt prblms | D. severe prblms | E. deaf rcvr. |
| 106 | other friends: | A. none | B. slight prblm |
|  | C. signfcnt prblms | D. severe prblms | E. deaf rcvr. |
| 107 | other people: | A. none | B. slight prblm |
|  | C. signfcnt prblms | D. severe prblms | E. deaf rcvr. |

Are any of these people speakers of other languages which the client shares?

108  primary care-providers:   A. doesn't understand English
    B. much prefers other language   C. moderately prefers other
    D. also uses other   E. no other language 109  most important people:   A. doesn't understand English
    B. much prefers other language   C. moderately prefers other
    D. also uses other   E. no other language 110  other friends:   A. doesn't understand English
    B. much prefers other language   C. moderately prefers other
    D. also uses other   E. no other language 111  other people:   A. doesn't understand English
    B. much prefers other language   C. moderately prefers other
    D. also uses other   E. no other language If a device could produce a visual display of characters not standard in English, could the other-language-speaker take advantage of it?

112  primary care-providers:
    A. NA; no other lang.   B. No; lang. requires no special char's.
    C. Yes; special char's required and he/she reads it.
    D. Maybe; lang. reqrs special char's but he/she reads it w/difficulty.
    E. No; lang. requires special char's but he/she doesn't read it.

113  most important people:
    A. NA; no other lang.   B. No; lang. requires no special char's.
    C. Yes; special char's required and he/she reads it.
    D. Maybe; lang. reqrs special char's but he/she reads it w/difficulty.
    E. No; lang. requires special char's but he/she doesn't read it.

114  other friends:
    A. NA; no other lang.   B. No; lang. requires no special char's.
    C. Yes; special char's required and he/she reads it.
    D. Maybe; lang. reqrs special char's but he/she reads it w/difficulty.
    E. No; lang. requires special char's but he/she doesn't read it.

115  other people:
    A. NA; no other lang.   B. No; lang. requires no special char's.
    C. Yes; special char's required and he/she reads it.
    D. Maybe; lang. reqrs special char's but he/she reads it w/difficulty.
    E. No; lang. requires special char's but he/she doesn't read it.

Are any of these people wheel-chair users?

| # | Question | | |
|---|---|---|---|
| 116 | primary care-givers | A. yes | B. no |
| 117 | most important people | A. yes | B. no |
| 118 | other friends | A. yes | B. no |
| 119 | other people | A. yes | B. no |

Do any of these people have cognitive deficits?

| # | Question | | |
|---|---|---|---|
| 120 | primary care-providers: | A. none | B. mild deficit |
|  | C. moderate deficit | D. severe deficit. | |
| 121 | most important people: | A. none | B. mild deficit |
|  | C. moderate deficit | D. severe deficit. | |
| 122 | other friends: | A. none | B. mild deficit |
|  | C. moderate deficit | D. severe deficit. | |
| 123 | other people: | A. none | B. mild deficit |

TABLE 1-continued

NEEDS QUESTIONNAIRE:

C. moderate deficit   D. severe deficit.
Are any of these people children under 10?
124 primary care-givers    A. yes    B. no
125 most important people   A. yes    B. no
126 other friends           A. yes    B. no
127 other people            A. yes    B. no
Estimate their support for and willingness to interact with
the client as a communication device user:
128 primary care-providers:
A. high   B. >ave   C. ave   D. <ave   E. low
129 people most important to client:
A. high   B. >ave   C. ave   D. <ave   E. low
130 other friends:
A. high   B. >ave   C. ave   D. <ave   E. low
131 other people with whom client interacts:
A. high   B. >ave   C. ave   D. <ave   E. low
Estimate how well these people would cope if understanding
the device user's messages required some effort of learning:
132 primary care-providers:
A. exclnt   B. good   C. fair   D. poor.
133 people most important to client:
A. exclnt   B. good   C. fair   D. poor.
134 other friends:
A. exclnt   B. good   C. fair   D. poor.
135 other people with whom client interacts:
A. exclnt   B. good   C. fair   D. poor.
Estimate how often messages would have to be output at
noraml speech rate or available for all-at-once reading, in order
to keep the attention of receivers:
136 primary care-providers:
A. always   B. often   C. occsnly   D. rarely   E. never
137 people most important to client:
A. always   B. often   C. occsnly   D. rarely   E. never
138 other friends:
A. always   B. often   C. occsnly   D. rarely   E. never
139 other people with whom client interacts:
A. always   B. often   C. occsnly   D. rarely   E. never
How do they feel the client's using an artificial limb
140 primary care-providers:   A. in favor   B. neutral
C. don't like the idea   D. very much opposed.
141 most important people:   A. in favor   B. neutral
C. don't like the idea   D. very much opposed.
142 other friends:   A. in favor   B. neutral
C. don't like the idea   D. very much opposed.
143 other people:   A. in favor   B. neutral
C. don't like the idea   D. very much opposed.
Do you think they will accept the robot-like, monotonic
voice available in most communication aids with
speech output?
144 primary care-providers:   A. probably accept
B. may not accept   C. probably won't accept.
145 most important people:   A. probably accept
B. may not accept   C. probably won't accept.
146 other friends:   A. probably accept
B. may not accept   C. probably won't accept.
147 other people:   A. probably accept
B. may not accept   C. probably won't accept.
How much training by a professional will they receive in how
to interact with the client as a communication device user?
148 primary care-providers:
A. none   B. 1-2 sessions   C. >2 sessions.
149 people most important to client:
A. none   B. 1-2 sessions   C. >2 sessions.
150 other friends:
A. none   B. 1-2 sessions   C. >2 sessions.
151 other people with whom client interacts:
A. none   B. 1-2 sessions   C. >2 sessions.

What is claimed is:

1. Method for prescribing a communication device for a patient with a neuromoter deficit affecting speech comprising:
assessing the patient's motor abilities for control of a keyboard-type device, said motor ability assessing including measuring reach envelope ability, actuation force ability, and actuation accuracy ability;
assessing characteristics of each of a plurality of keyboard-type communication devices, said characteristics assessing including deriving an expert keystroke history for each said keyboard-type device for production of a sample text corpus; and
evaluating the results of each said assessing to prescribe a communication device for the patient.

2. The method of claim 1 wherein the step of deriving an expert keystroke history comprises:
determining the length of the longest unit of text in the language menu of said keyboard-type device,
selecting a sequence of characters from said sample text corpus equal in number to said longest unit length, and
attempting to match said selected characters to a unit of text in said language menu.

3. The method of claim 2 further comprising repeatedly dropping a character from said selected characters and attempting to match the resulting group of characters to a unit of text in said language menu until a match is found.

4. The method of claim 2 wherein said selecting commences with the leftmost characters from said sample text corpus, and continues through said text corpus until all character groups have been matched to units of text in said language menu.

5. The method of claim 1 wherein the results of each said assessing are entered into a computer and said evaluating is performed by said computer.

6. The method of claim 1 wherein said motor ability assessing includes automated data acquisition by a computer.

7. The method of claim 1 further comprising:
identifying a minimal motor ability operational requirement for each said keyboard-type communication device, and
excluding from consideration any said keyboard-type communication device for which the patient's motor abilities fall below said minimal motor ability operational requirement.

8. The method of claim 7 wherein said minimal operational requirement for each keyboard-type communication device comprises:
requirement of an ability to move to the most distant key in each of a plurality of directions;
requirement of an ability to produce a minimum force at each key; and
requirement of an ability to touch a selected key while not touching adjacent keys.

9. The method of claim 1 wherein said reach envelope ability measuring comprises measuring the greatest distance the patient can reach in each of a plurality of directions.

10. The method of claim 1 wherein said actuation force ability measuring comprises measuring the largest force the patient can reliably exert at each position of greatest reach ability.

11. The method of claim 1 wherein said actuation accuracy ability measuring comprises measuring the smallest target size the patient can reliably touch when alternately touching each of a pair of targets at opposite locations of greatest reach ability.

12. The method of claim 1 wherein said keyboard-type motor abilities assessing comprises:
directing the patient to repeatedly move between two targets;
varying the target characteristics; and
measuring the time the patient takes to move between the targets for each combination of characteristics.

13. The method of claim 12 wherein said varying characteristics include:
   distance between targets;
   size of each target;
   angular direction of movement between targets;
   force required to depress each target; and
   travel of target required to depress each target.

14. The method of claim 13 wherein the performance speed is directly dependent on the accuation force and the travel of target.

15. The method of claim 12 wherein each said target is an electrical switch.

16. The method of claim 12 further comprising calculating a client's motor determined maximum rate for each said keyboard-type communication device using said target characteristics and said time to move between targets.

17. The method of claim 16 wherein said motor determined maximum rate calculating comprises applying the results of said time to move between targets measuring to said optimized keystroke history.

18. The method of claim 1 further comprising:
   assessing the patient's cognitive abilities, and assessing
   the patient's sensory abilities.

19. The method of claim 18 wherein said cognitive assessing comprises assessing spelling, code learning and location learning abilities, and said sensory assessing comprises assessing vision and hearing abilities.

20. The method of claim 19 further comprising:
   identifying a minimal cognitive and sensory operational requirement for each said keyboard-type communication device, and
   excluding from consideration any said keyboard-type communication device for which the patient's spelling, code learning, location learning, vision or hearing ability falls below said cognitive and sensory minimal operational requirement.

21. The method of claim 19 further comprising:
   assessing the patient's needs and preferences, and
   combining each said motor determined maximum rate with said needs and preferences to determine an expected benefit from use of each said keyboard-type communication device.

22. The method of claim 21 further comprising:
   determining a reference motor determined maximum rate and a reference expected benefit for at least one scanning-type communication device;
   excluding assessing the patient's motor abilities for controlling each scanning-type communication device if any of said keyboard-type devices yields both a greater motor determined maximum rate than said reference rate for all said scanning-type devices, and a greater expected benefit than said reference benefit for all said scanning-type devices; and
   assessing the patient's motor abilities for controlling each scanning-type communication device if any of said keyboard-type devices yields either the same or a lesser motor determined maximum rate than said reference rate for any of said scanning-type devices, or the same or lesser expected benefit than said reference benefit for any of said scanning-type devices.

23. The method of claim 21 further comprising:
   determining said reference motor determined maximum rate for each said scanning-type communication device from assessment of at least one able-bodied person's motor abilities in controlling said scanning-type communication device; and
   determining said reference expected benefit for each said scanning-type communication device from the patient's needs and preferences and said reference rate.

24. The method of claim 23 wherein said scanning-type motor abilities assessing further comprises:
   directing the patient to close a switch twice;
   measuring the time the patient takes to initially close the switch; and
   measuring the time from the first switch closure to the second switch closure.

25. The method of claim 24 wherein the scanning rates are varied.

26. The method of claim 25 wherein said rates are varied in response to the patient's prior scanning-type assessing measurements.

27. The method of claim 24 wherein each said switch is a paddle switch.

28. The method of claim 24 wherein each said switch is a breath pressure switch.

29. The method of claim 24 further comprising calculating a motor determined maximum rate for each said scanning-type communication device using the results of said time measuring.

30. The method of claim 29 wherein said motor determined maximum rate calculating comprises:
   deriving a scan interval history for production of at least one sample text: and
   applying the results of said time measuring to said scan interval history.

31. The method of claim 30 wherein the results of said time to switch closure measuring and said time to switch release measuring are used to calculate said motor determined maximum rate for each said scanning-type device which operates in dwell mode.

32. The method of claim 30 wherein the results of said time to initial switch closure measuring and said time from first switch closure to second switch closure measuring are used to calculate the motor determined maximum rate for each said scanning-type device which does not operate in dwell mode.

33. The method of claim 29 further comprising:
   combining each said motor determined maximum rate with the patient's needs and preferences to determine the expected benefit to the patient from use of said scanning-type communication device.

34. The method of claim 21 wherein said scanning-type motor abilities assessing comprises:
   directing the patient to close and release a switch;
   measuring the time the patient takes to close the switch; and
   measuring the time the patient takes to release the switch.

35. The method of claim 19 wherein said code learning ability assessing comprises:
   directing the patient to learn an association between codes and sets of words, and
   testing the learning of said association.

36. The method of claim 35 wherein said association learning comprises:
   learning association between a single digit code and each of three words,
   learning association between a two digit code and each of five words, and
   learning association between a two digit code and each of seven words.

37. The method of claim 19 wherein said location learning ability assessing comprises:
   directing the patient to learn an association between locations and groups of letters, and
   testing the learning of said association.

38. The method of claim 19 wherein said spelling ability assessing comprises:
   placing letters of the alphabet into areas,
   communicating a word to the patient, and
   directing the patient to indicate in sequence each of said areas which contains letters for the proper spelling of said word.

39. The method of claim 1 further comprising assessing the patient's motor abilities in controlling an encoded-type device using body-distributed switches.

40. The method of claim 39 wherein said encoded-type motor abilities assessing comprises:
   directing the patient to alternately make at least one pair of switch closures; and
   measuring the time between the first switch closure and the second switch closure.

41. The method of claim 40 wherein said switch closures are made with a single switch and the patient is directed to Close said single switch at least twice.

42. The method of claim 40 wherein said switch closures are made with at least one pair of switches and the patient is directed to alternate closures between said switches.

43. The method of claim 40 wherein the patient is directed to close a plurality of pairs of switches and the time between each closure is measured.

44. The method of claim 40 wherein the sequence and pairs of switch closings is varied.

45. The method of claim 40 further comprising calculating a motor determined maximum rate for each said encoded-type communication device using the results of said time between switch closure measuring.

46. The method of claim 45 wherein said encoded-type motor determined maximum rate calculating comprises:
   deriving a switch closure frequency history for production of at least on sample text; and
   applying the results of said time between closure measuring to said switch closure frequency history.

47. The method of claim 46 further comprising:
   assessing the patient's needs and preferences, and
   combining each said encoded-type motor determined maximum rate with the patient's needs and preferences to determine the expected benefit to the patient from use of said encoded-type communication device.

48. Method for prescribing a communication device for a patient with a neuromoter deficit affecting speech, which method utilizes a single input switch connected to a computer screen consisting of an upper row comprising a series of box outlines wherein one of said boxes is filled in with a target, and a cross hair cursor controlled by the switch and capable of moving across a bottom row on the screen in the manner of a one dimensional scanner, said method comprising:
   closing and releasing the switch as quickly as possible when the cursor matches the target, whereby the response timeduring a single strike and the dwell time or closure-to-release time is measured;
   closing the switch twice as quickly as possible when the cursor matches the target;
   repeating both of said steps at decreasing scanning intervals until the client can no longer successfully complete the task;
   increasing the scanning interval to the last successful scanning interval, and decreasing said interval in smaller steps than previously until the client fails for a second time to perform the task, whereby the response time during a repeated strike as well as the time between successive switch closures is measured.

49. Method for prescribing an encoded type of communication device for a patient with a neuromoter deficit affecting speech, utilizing on/off switches affixed to various parts of the patient's body, comprising:
   sequentially closing a pair of randomly designated switches;
   measuring the time between closure of one switch and closure of the second switch in the pair;
   repeating the performance until combinations of switching pairs have been exhausted;
   determining the average values of the closure to closure times for all pairs of switches;
   calculating a motor determined maximum rate for each of said encoded communication devices using the frequency with which switch closure at each input jack is followed by closure at all other input jacks and the closure-to-closure time required for each switch pair.

* * * * *